United States Patent
Nakamichi

[11] Patent Number: 5,862,109
[45] Date of Patent: Jan. 19, 1999

[54] CHANGER-TYPE DISC PLAYBACK DEVICE

[75] Inventor: Niro Nakamichi, Tokyo, Japan

[73] Assignee: Nakamichi Corporation, Japan

[21] Appl. No.: 728,092

[22] Filed: Oct. 9, 1996

Related U.S. Application Data

[63] Continuation of Ser. No. 364,623, Dec. 27, 1994, abandoned.

[30] Foreign Application Priority Data

Dec. 27, 1993 [JP] Japan ................................ 5-348692

[51] Int. Cl.$^6$ ............................. G11B 17/22; G11B 17/26
[52] U.S. Cl. .......................... 369/36; 369/178; 369/191; 360/98.04
[58] Field of Search ............................. 360/98.04, 98.05, 360/98.06, 99.02, 99.03, 99.06, 99.07; 369/33, 34, 36, 38, 178, 179, 181, 191, 192

[56] References Cited

U.S. PATENT DOCUMENTS

| | | | |
|---|---|---|---|
| 4,782,473 | 11/1988 | Masaki | 369/36 |
| 5,123,000 | 6/1992 | Fitzgerald et al. | 369/36 |
| 5,164,928 | 11/1992 | Oliver et al. | 369/34 |
| 5,210,728 | 5/1993 | Noguchi et al. | 369/36 |
| 5,384,760 | 1/1995 | Kumakura | 369/36 |

FOREIGN PATENT DOCUMENTS

| | | | |
|---|---|---|---|
| 59-30263 | 2/1984 | Japan | 369/36 |

*Primary Examiner*—David L. Ometz
*Attorney, Agent, or Firm*—Morrison Law Firm

[57] ABSTRACT

A disc player moves a selected disc between a playback position and a stocker. Carriages, for holding discs, are stacked concentrically and pivotally supported tightly together within the stocker. The carriages are extracted from the stocker by lifting a front end of an adjacent carriage above the selected carriage. A shuttle then moves the selected carriage from the stocker to the playback position. When the disc player is turned on, the device goes through an initialization sequence to determine whether the carriage, aligned with the playback position, is in the store position within the stocker. If not, the shuttle moves the carriage to the store position. If the carriage and shuttle do not return to the store position within a predetermined period of time, then the disc player attempts to re-engage the shuttle with the carriage by shifting the stocker slightly to clear the shuttle path, while attempting to drive the shuttle to its home position.

32 Claims, 31 Drawing Sheets

CHANGER-TYPE DISC PLAYBACK DEVICE

This application is a continuation of application Ser. No. 08/364,623, filed Dec. 27, 1994, now abandoned.

BACKGROUND OF THE INVENTION

The present invention relates to a changer-type disc playback device. Specifically, the present invention relates to a changer-type playback device which moves a selected carriage out of a plurality of carriages stored within a stocker to a playback position via a shuttle.

The present applicant proposed a changer-type disc playback device in U.S. patent application Ser. No. 08/204,558, filed (Mar. 1, 1994) now U.S. Pat. No. 5,508,994. In that application, carriages are aligned within a stocker of the disc playback device in which carriages above a selected carriage were lifted upward by a carriage lifter mechanism to increase the space between a disc on the selected carriage and overlapping discs in the remaining carriages.

A drawback of this prior art device is that the shuttle which moves the selected carriage between the stocker and other operating positions tends to disengage from the selected carriage. Absent proper engagement, the shuttle cannot transport the selected carriage between the stocker and the turntable.

OBJECTS AND SUMMARY OF THE INVENTION

It is accordingly an object of the present invention to provide a changer-type disc playback device which overcomes the drawbacks of the prior art.

It is a further object of the present invention to provide a changer-type disc player in which a shuttle can re-engage the selected carriage in the event that it disengages.

Briefly stated, the present invention relates to a changer-type disk player. A stocker concentrically aligns a number of carriages for holding individual disks. The stocker moves to align a selected carriage with a playback position in which a disk can be read. A shuttle engages the selected carriage, and moves it from the stocker to the playback position. In the event that the shuttle disengages from the selected carriage, the stocker moves the carriages to align the shuttle between one of said number of carriages and an adjacent carriage. The shuttle is withdrawn into the stocker to re-engage with the carriages. In the event that the shuttle cannot re-engage, the process repeats for a predetermined number of cycles.

According to an embodiment of the invention, there is provided a changer-type disc player for storing discs, comprising: a stocker having at least first and second carriages for supporting said discs, said stocker being movable along an axis perpendicular to a plane defined by said first carriage, a shuttle, means for moving said shuttle between a store position, disposed within said stocker, and a playback position, said at least first and second carriages having a portion which engages said shuttle such that a selected carriage of said at least first and second carriages moves with said shuttle between said store and playback positions, means for reading a disc on said selected carriage when in said playback position, means for detecting a state where said shuttle has disengaged from said portion of said selected carriage, means, responsive to said means for detecting, for moving said stocker to a predetermined position, means, responsive to said means for moving said stocker to said predetermined position, for returning said shuttle to said store position, and means, responsive to said means for returning, for re-engaging said shuttle with said portion of one of said at least first and second carriages.

According to a feature of the invention, there is provided a changer-type disc player for storing discs, comprising: a stocker having a plurality of carriages for supporting said discs, each of said plurality of carriages having a cutout, said stocker being movable along an axis perpendicular to a plane defined by a carriage of said plurality of carriages, a shuttle, means for moving said shuttle between a store position, disposed within said stocker, and a playback position, said shuttle engaging said cutout of a selected one of said plurality of carriages such that said selected carriage moves with said shuttle between said store and playback positions, means for reading said selected disc in said playback position, means for detecting a state where said shuttle has disengaged from said selected carriage, means, responsive to said means for detecting, for moving said stocker to a predetermined position, means, responsive to said means for moving said stocker to said predetermined position, for returning said shuttle to said store position, and means, responsive to said means for returning, for re-engaging with said cutout of said plurality of carriages.

According to a further feature of the present invention, there is provided a changer-type disk playback device comprising: a plurality of carriages having disk mounting areas, a stocker supporting said plurality of carriages in a stacked fashion so that said carriages can be inserted or removed, means for moving said stocker along the direction of the carriage stack, first position control means for controlling said means for moving and taking a selected carriage out of said plurality of carriages held in said stocker and aligning said selected carriage with a playback position for performing disk playback, a shuttle engaging with an engagement piece of said selected carriage and being movable moving between a first position, where said carriage is brought to a holding position within said stocker, and a second position, at said playback position, disk playback means playing back a disk on said selected carriage brought to said playback position, detecting means for detecting a carriage disengagement state, in which said shuttle is disengaged from said engagement piece of said selected carriage, second position control means for controlling said means for moving and bringing said stocker to a prescribed position responsive to said detecting means, and means for returning the shuttle toward said first position when said stocker is brought to said prescribed position and returning said shuttle to a state where it can engage with said engagement piece of said carriage aligned with said playback position.

According to a still further feature of the invention, there is provided a disc handling device comprising: at least one storage position, at least a second position displaced from said at least one storage position, a carriage, a shuttle, means on said shuttle for engaging an engagement part of said carriage, means for driving said shuttle between first and second positions, said first position positioning said carriage in said at least one storage position, said second position positioning said carriage in said second position, means for detecting failure of said shuttle to reach said first position when said carriage is in said at least one storage position, whereby a mis-engagement of said means on said shuttle for engaging and said engagement part is detected, and means, responsive to said failure, for incrementally shifting said carriage out of a plane defined by motion of said shuttle, and then resuming driving said shuttle toward said first position, whereby said means on said shuttle for engaging and said engagement part of said carriage are aligned for engagement thereof.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 34 is a sample display for display 329.

FIG. 35 is another sample display for display 329.

FIG. 36 is still another sample display for display 329.

DETAILED DESCRIPTION OF THE PREFERRED EMBODIMENTS

Figure 1:
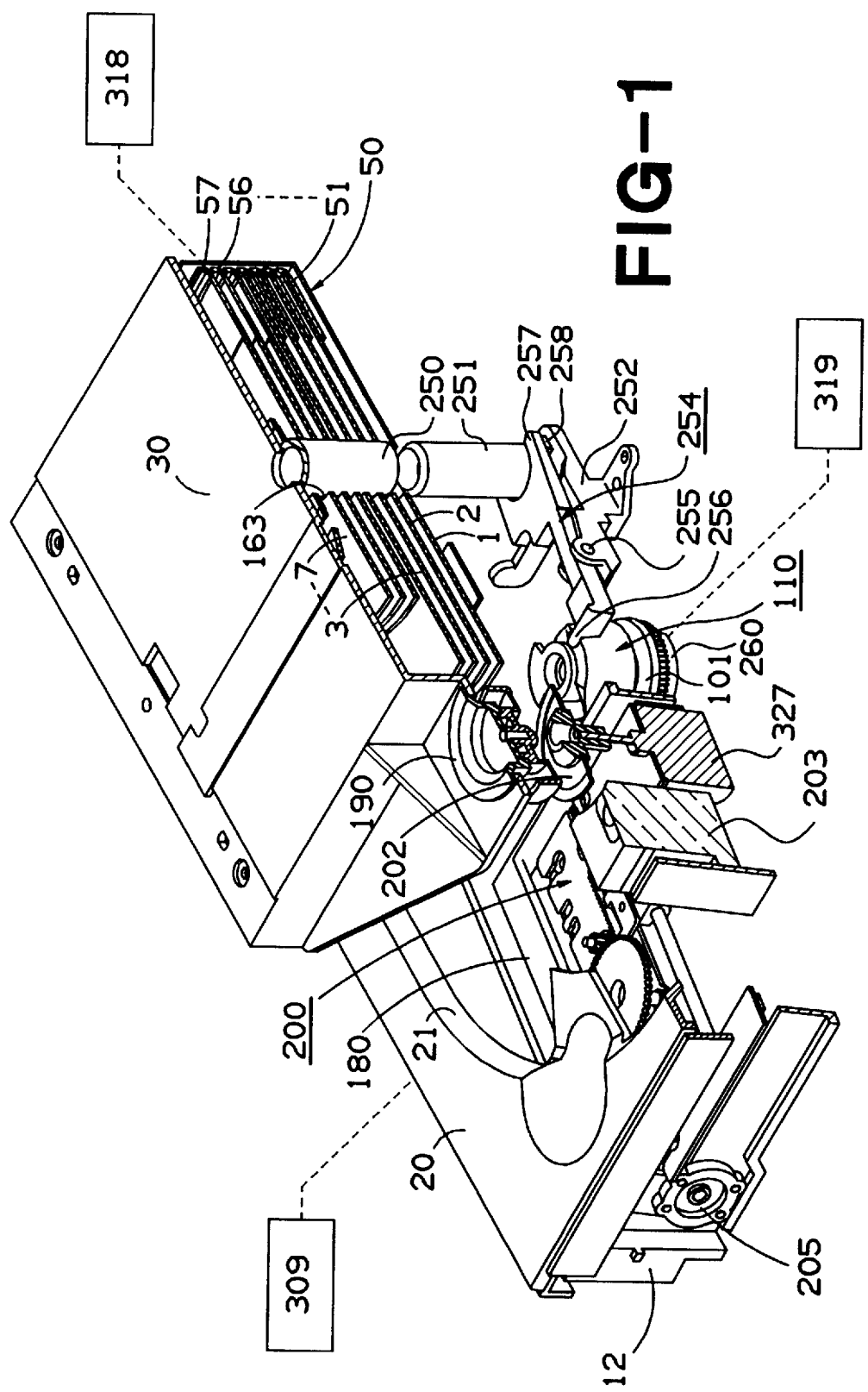
FIG. 1 is a cross-section perspective drawing of a disc playback device, according to an embodiment of the present invention, shown in a stop mode.

Referring to FIG. 1, a disc playback device, shown generally at 1000, includes a stocker 50 which holds seven carriages 51–57. Each carriage 51–57 has a 12 cm diameter first recess 162 for receiving individual standard size compact discs 1. Each of the fifth, sixth and seventh carriages 55–57 of stocker 50 also have a centered 8 cm diameter second recess 166 for smaller single-play discs.

Figure 2:
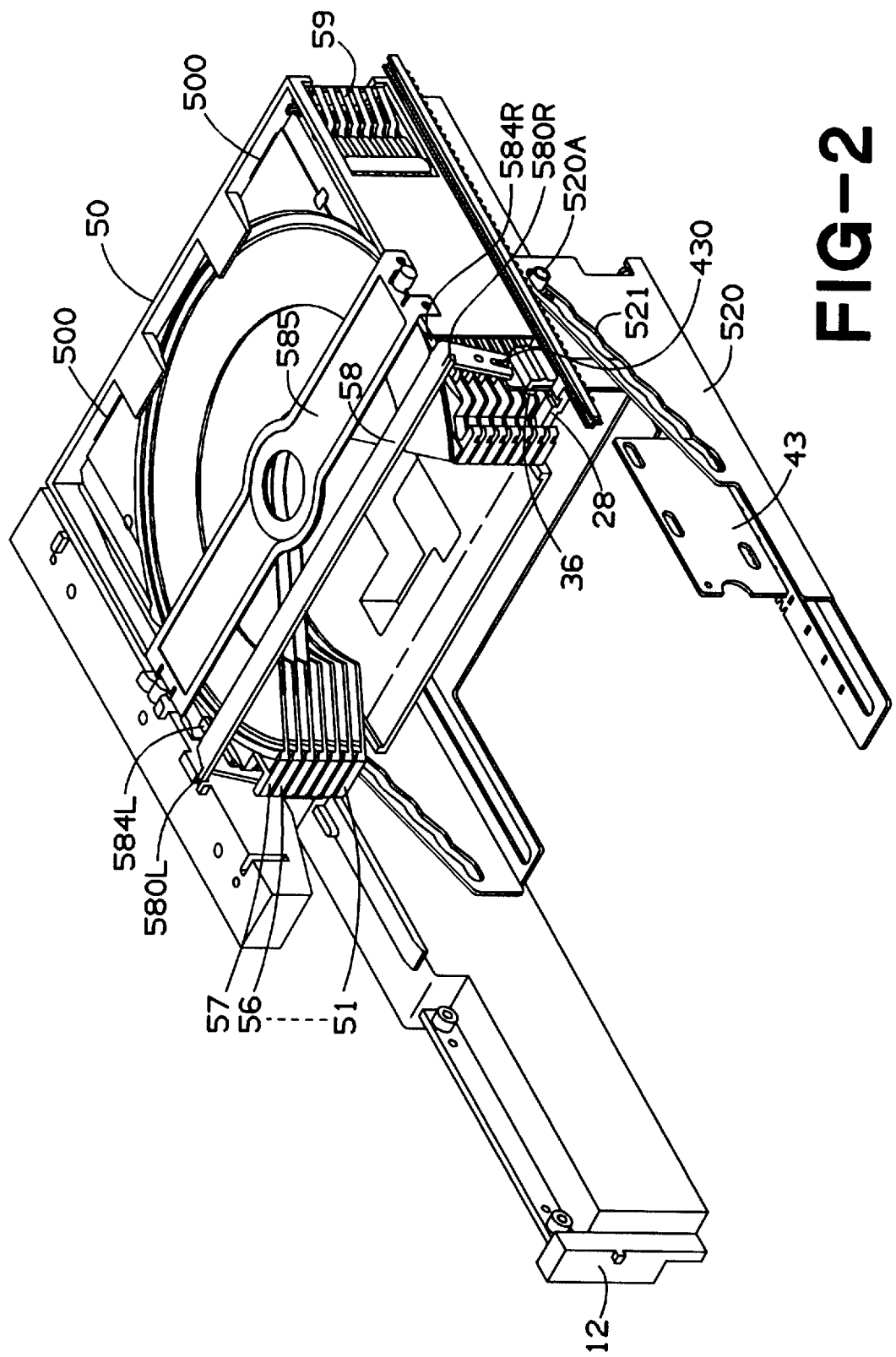
FIG. 2 is a perspective drawing showing the relationship between the carriage lifter mechanism and the stocker while in the stop mode.
Figure 7:
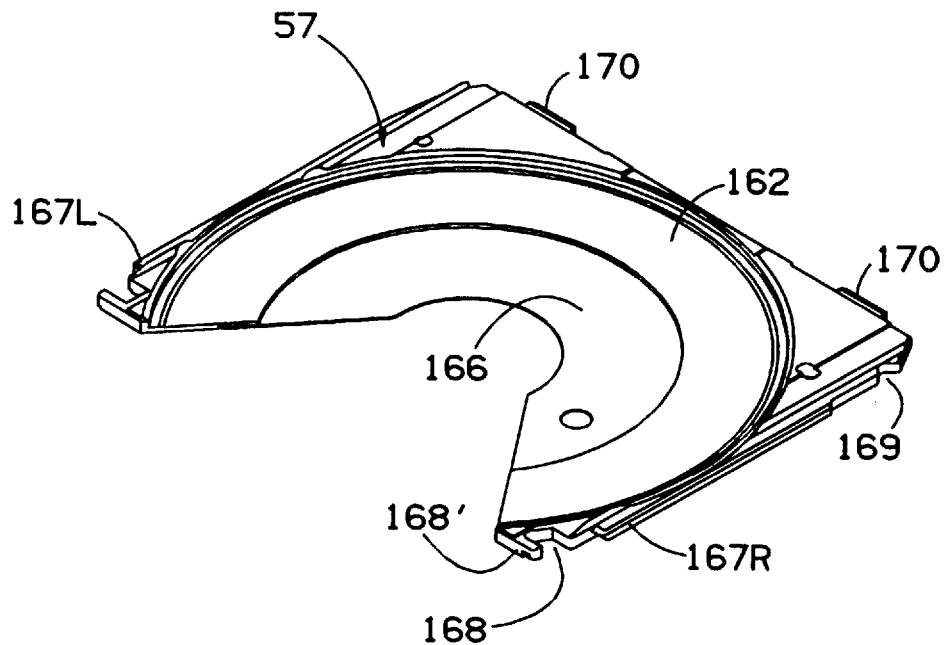
FIG. 7 is a perspective drawing of the seventh carriage.

Referring now also to FIGS. 2 and 7, a comb-type spring 59 attached at the rear of stocker 50 includes fingers which engage V-shaped notches 169 in each carriage 51–57, concentrically aligning carriages 51–57. Each of carriages 51–57 has two protrusions 170 which engage slits 500 in the rear of stocker 50, permitting the front of each carriage 51–57 to pivot upwards about its protrusions 170. An upper plate 585 reinforces the top of stocker 50 and limits the pivotal range of carriage 57.

Stocker displacement mechanism 318 moves stocker 50 vertically to align one of seven store positions Pos(1)–Pos(7), corresponding to the locations of the seven carriages 51–57, with a vertical level of a playback position. The store position is a position of a disc, or carriage, of stocker 50 which is in planar alignment with the playback position.

Displacement of stocker 50 is accomplished as follows. A left chassis 12 and 9 right chassis (not shown) guide stocker 50 along an axis defined by the arrow Z. A cam groove 521 of a sliding panel 520 engages a projection 520A of stocker 50. As sliding panel 520 moves along an X axis, projection 520A raises or lowers stocker 50 into one of positions POS(1)–POS(7).

Figure 5:
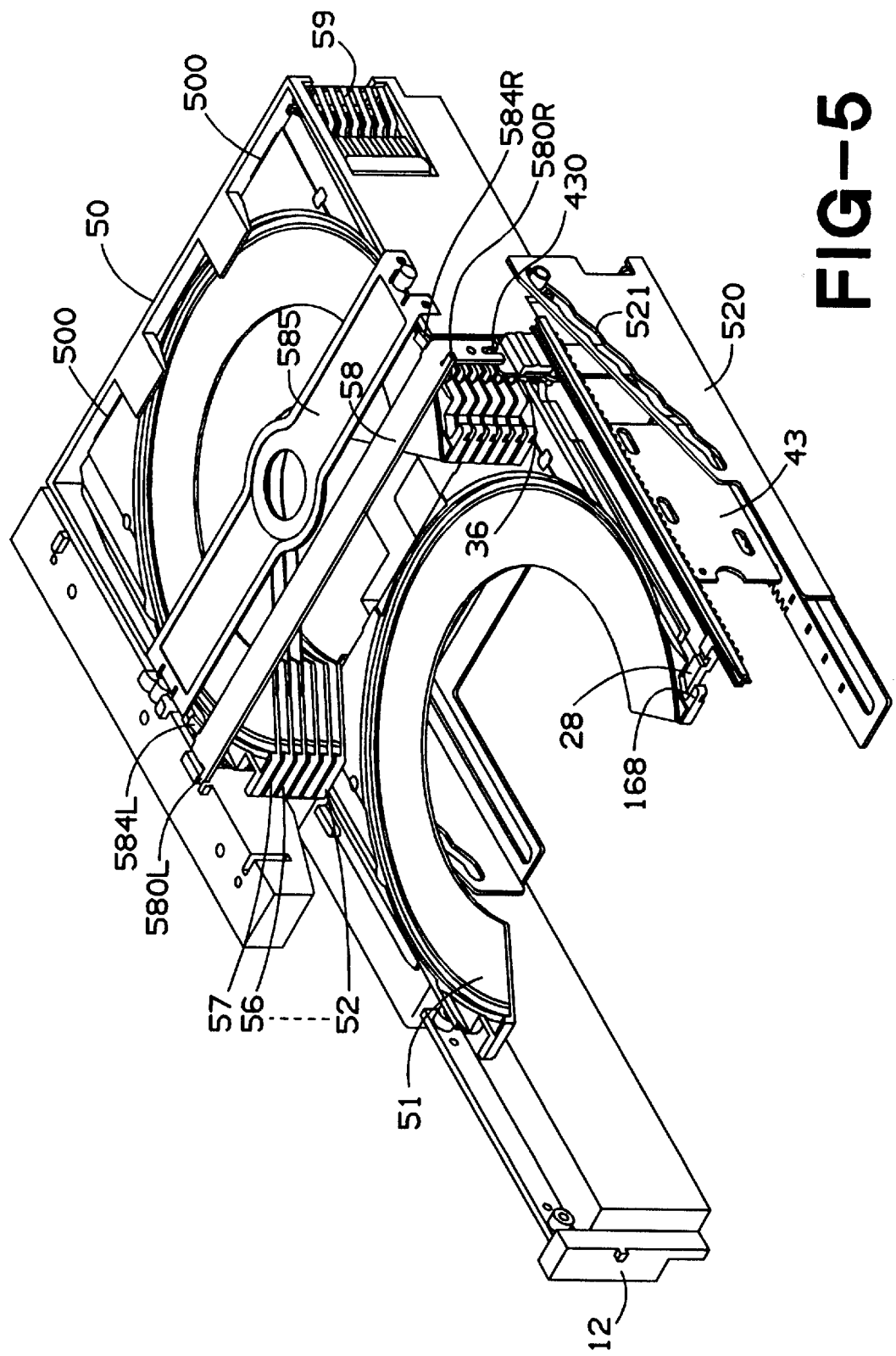
FIG. 5 is a perspective drawing of showing the relationship between the carriage lifter mechanism and the stocker while in the play mode.
Figure 6:
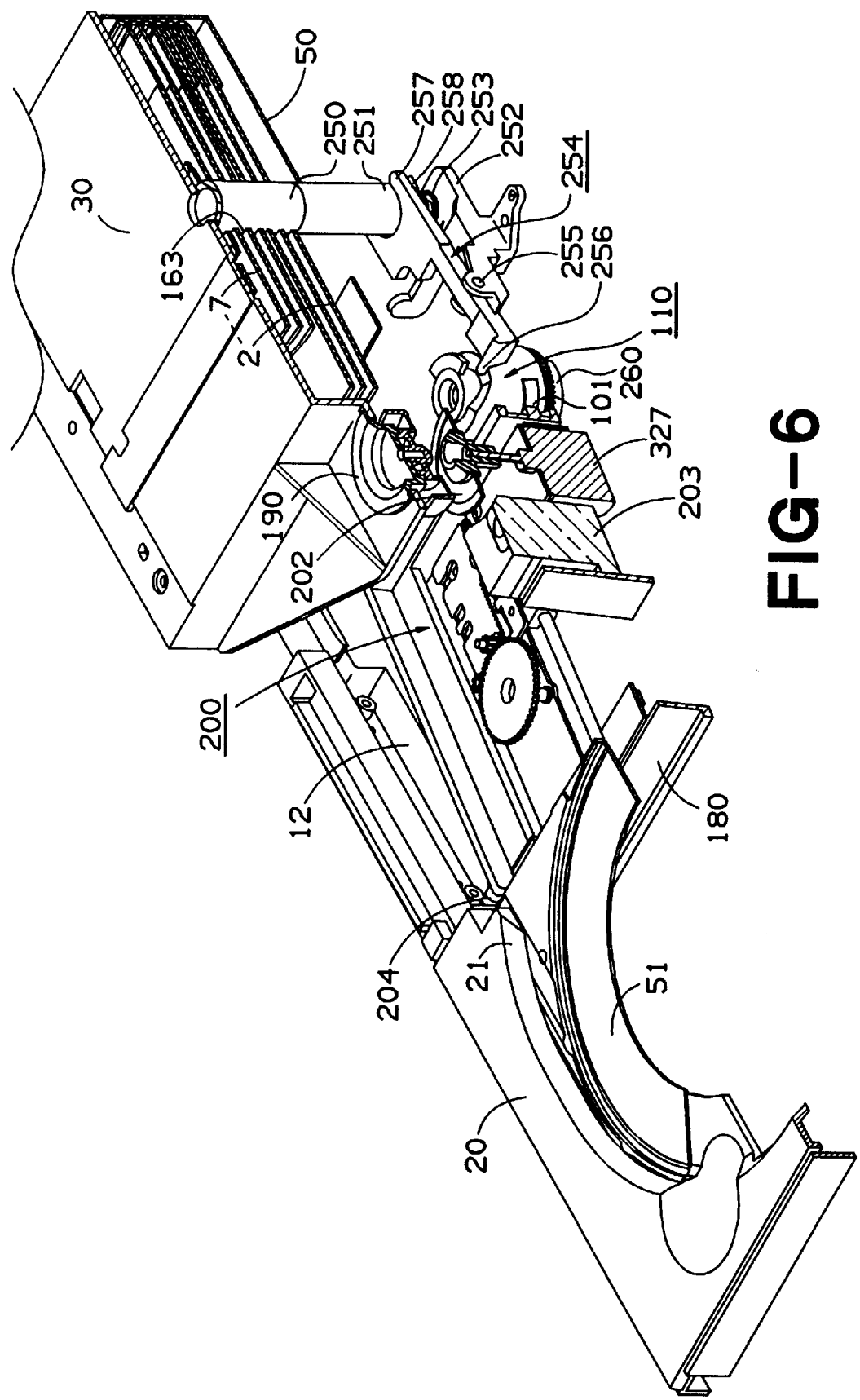
FIG. 6 is a cross-section perspective drawing of the present disc playback device in an eject mode.

Once a selected carriage is aligned with the store position, a shuttle 28 of a tray/carriage transport mechanism 309 engages a cutout 168 in the selected carriage (the selected carriage is shown as carriage 51 in FIG. 5). Shuttle 28 transports the selected carriage from the store position to a load position, in which it inserts the selected carriage into a tray 20. Tray 20, in turn, moves between a close position, where it is stored within the disc player, and an eject position, accessible from outside the disc player (See FIG. 6).

Referring now to FIGS. 2, 5 and 7, the right chassis (not shown) also supports and guides a control panel 43. As a shuttle 28 moves the selected carriage from the store position to the load position, control panel 43 moves rearward. A lifter pin 36, which projects from control panel 43, engages an inclined engagement piece 167R of an adjacent carriage located immediately above the selected carriage. When the selected carriage moves to the load position, lifter pin 36 pushes the right side of the adjacent carriage upward. The adjacent carriage in turn pushes upward all carriages located above the adjacent carriage.

Figure 8:
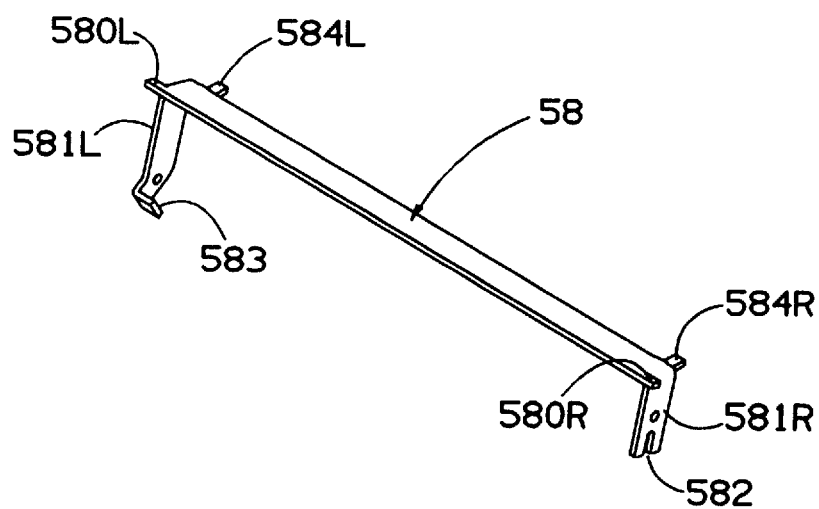
FIG. 8 is a perspective drawings of the tandem-motion member.

Referring now also to FIG. 8, upward force on the left side of the adjacent carriage is provided by a tandem-motion member 58. The disc player chassis (not shown) rotatably supports tandem-motion member 58 through shafts 580L and 580R. A groove 582 of tandem-motion member 58 engages a bend 430. Tandem motion member 58 rotates with the movement of control panel 43. When control panel 43 moves rearward, a lifter piece 583 on a left side 581L of tandem-motion member 58 engages an engagement piece 167L of the carriage next above the selected carriage, providing upward force on the left side of the adjacent carriage.

The combined force of lifter pin 36 and lifter piece 583 lifts each of carriages 51–57 which are disposed above the selected carriage, permitting the selected carriage to be dismounted smoothly from stocker 50. This also creates a space between the selected disc and the next higher overlapping disc on an adjacent carriage, thereby providing sufficient clearance for a magnetic damper 190 to clamp a disc.

Referring now to FIGS. 2 and 8, engagement pieces 584L and 584R of tandem-motion member 58 engage the upper surface of carriage 57 when stocker 50 is in the Pos(1) position, stabilizing carriages 51–57 from external vibrations.

A top panel 30, which is fixed on the chassis, covers stocker 50 and shafts 580L and 580R. A tongue at a front of top panel 30 supports magnetic damper 190, which fixes the disc onto a turntable 202.

Referring now to FIGS. 1, 3, 4 and 6, an upper disc-lock shaft 250 extends from a lower surface of top panel 30, projecting through spindle holes 163 of discs 1–7 stored within stocker 50. A lower end of upper disc-lock shaft 250 projects through spindle hole 163 of the n+1 carriage when stocker 50 is in Pos(n), preventing discs 1–7 from moving due to shock or tilting.

A support base 252 movably supports a lower disc-lock shaft 251 which coaxially opposes upper disc-lock shaft 250. Support base 252 permits lower disc-lock shaft 251 to move vertically to mate with upper disc-lock shaft 250 as follows. A spring 253 (shown in FIGS. 4 and 6), disposed within lower disc-lock shaft 251, applies an upward bias to lower disc-lock shaft 251. A control arm 254 is pivotally mounted on support base 252 by a shaft 255. A follower pin 256 extends from an end of control arm 254 to engage a cam groove 101 in an outer surface of a cam member 110. A cam member drive mechanism 319 drives cam member 110.

Figure 3:
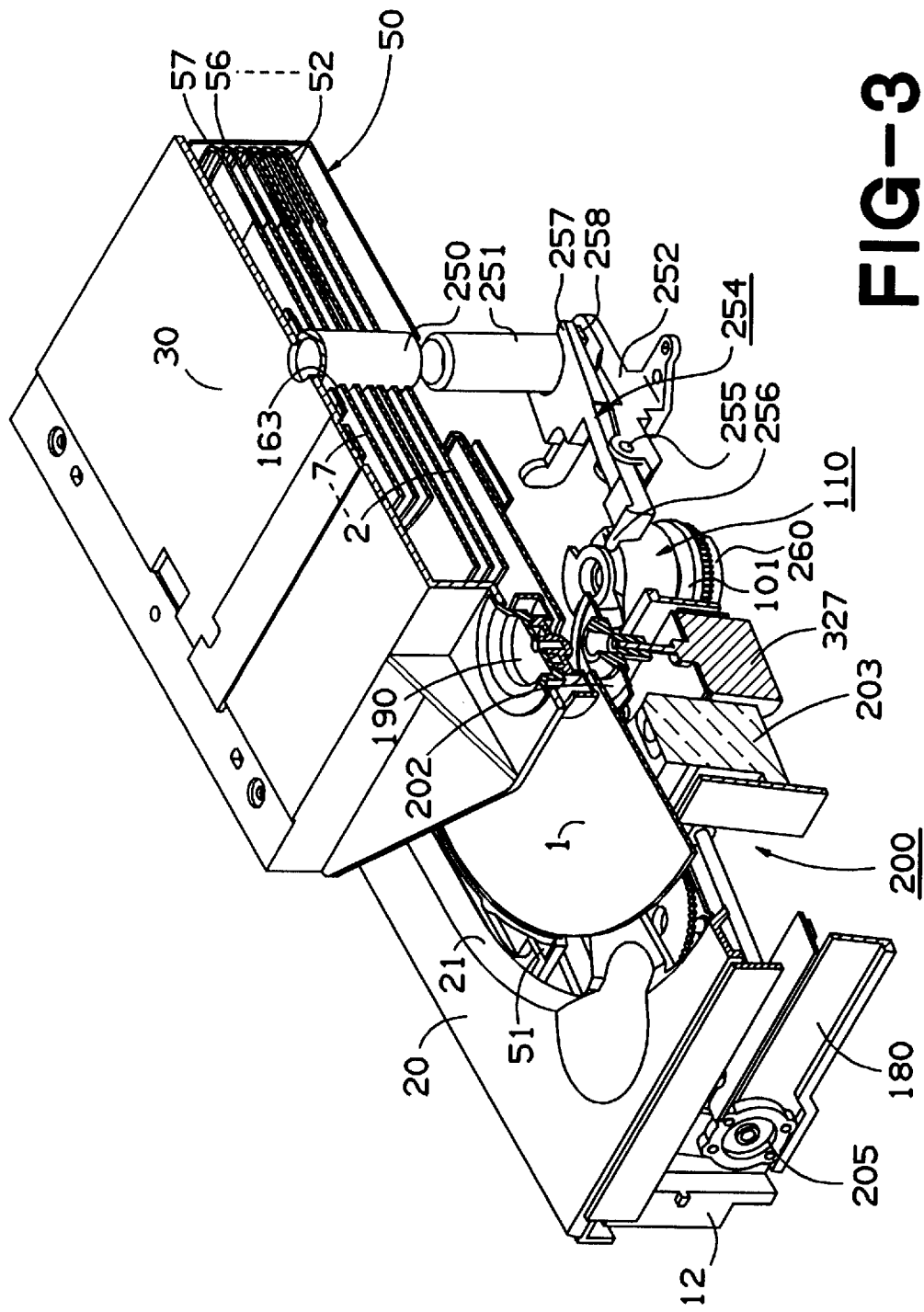
FIG. 3 is a cross-section perspective drawing of the present disc playback device when the first carriage is in a playback position.
Figure 4:
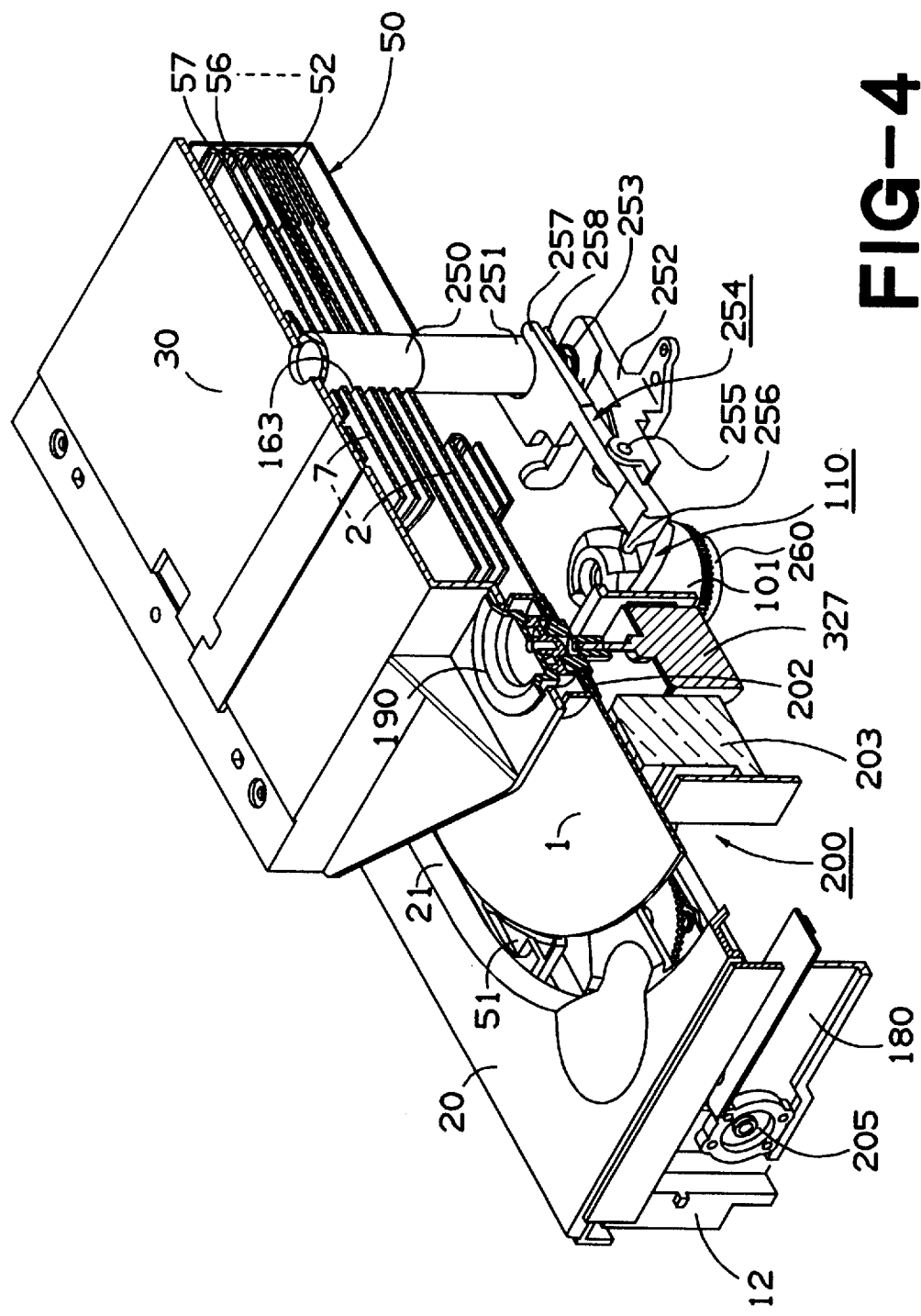
FIG. 4 is a cross-section perspective drawing of the present disc playback device in the play mode.

Cam groove 101 wraps around cam member 110 in a spiral fashion (only part of cam groove 101 is visible in the figures). A yoke 257, extending from another end of control arm 254, engages an upper surface of a pin 258 projecting from lower disc-lock shaft 251. Rotation of cam member 110 pivots control arm 254, thereby raising and lowering lower disc-lock shaft 251 between a lock position, in which it abuts upper disc-lock shaft 250 (FIG. 4), and an unlock position, in which its upper end retracts below the selected carriage (FIG. 3). Thus, lower disc-lock shaft 251 alternately passes through, and is withdrawn from, spindle hole 163 of the disc on the selected carriage as lower disc-lock shaft 251 moves up and down, respectively.

An optical mechanism 200, which includes an optical head 203 and a spindle motor 327, is disposed below tray 20. A horizontally mounted pin 204 pivotally supports a damper base 180, which in turn supports optical mechanism 200 through a damper 205. A second pin (not shown) engages cam groove 101, permitting optical mechanism 200 to move vertically responsive to rotation of cam member 110.

Optical mechanism 200 moves between an upper position and a lower position. In the upper position, optical mechanism 200 aligns with a disc in the playback position. In the lower position, optical mechanism 200 moves below the plane defined by the disc, thereby freeing the path for transferring a selected carriage into and out of tray 20. A cam 260, integrally formed on a lower portion of cam member 110, engages switches 312–314 that indicate different states of the disc playback device as described below.

Figure 9:
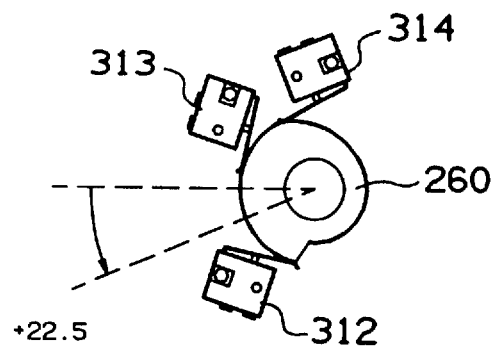
FIG. 9 is a drawing indicating the positional relationship between cam 260 and switches 312–314 at cam angle of +22.5°.
Figure 10:
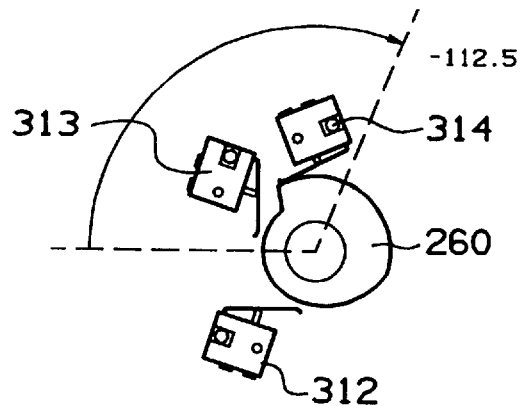
FIG. 10 is a drawing indicating the positional relationship between cam 260 and switches 312–314 at cam angle of −112.5°.
Figure 11:
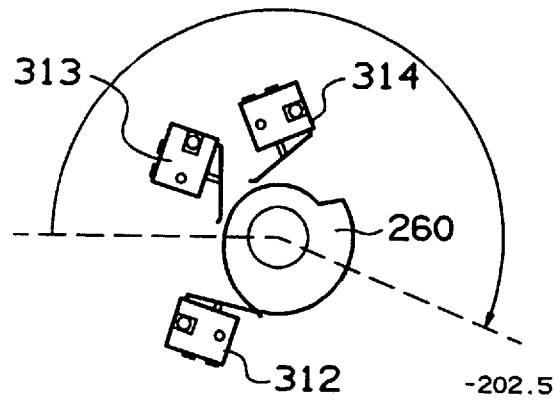
FIG. 11 is a drawing indicating the positional relationship between cam 260 and switches 312–314 at cam angle of −202.5°.

Referring now to FIGS. 9–11, cam 260 rotates with cam member 110 to sequentially actuate switches 312–314, positioned at separate locations on a lower surface of a main chassis of the disc playback device 1000. Actuation of switches 312–314 generate signals POS 1–3 (shown in FIG. 12), respectively, which are sent to a system controller ("syscon") 300.

Figure 12:
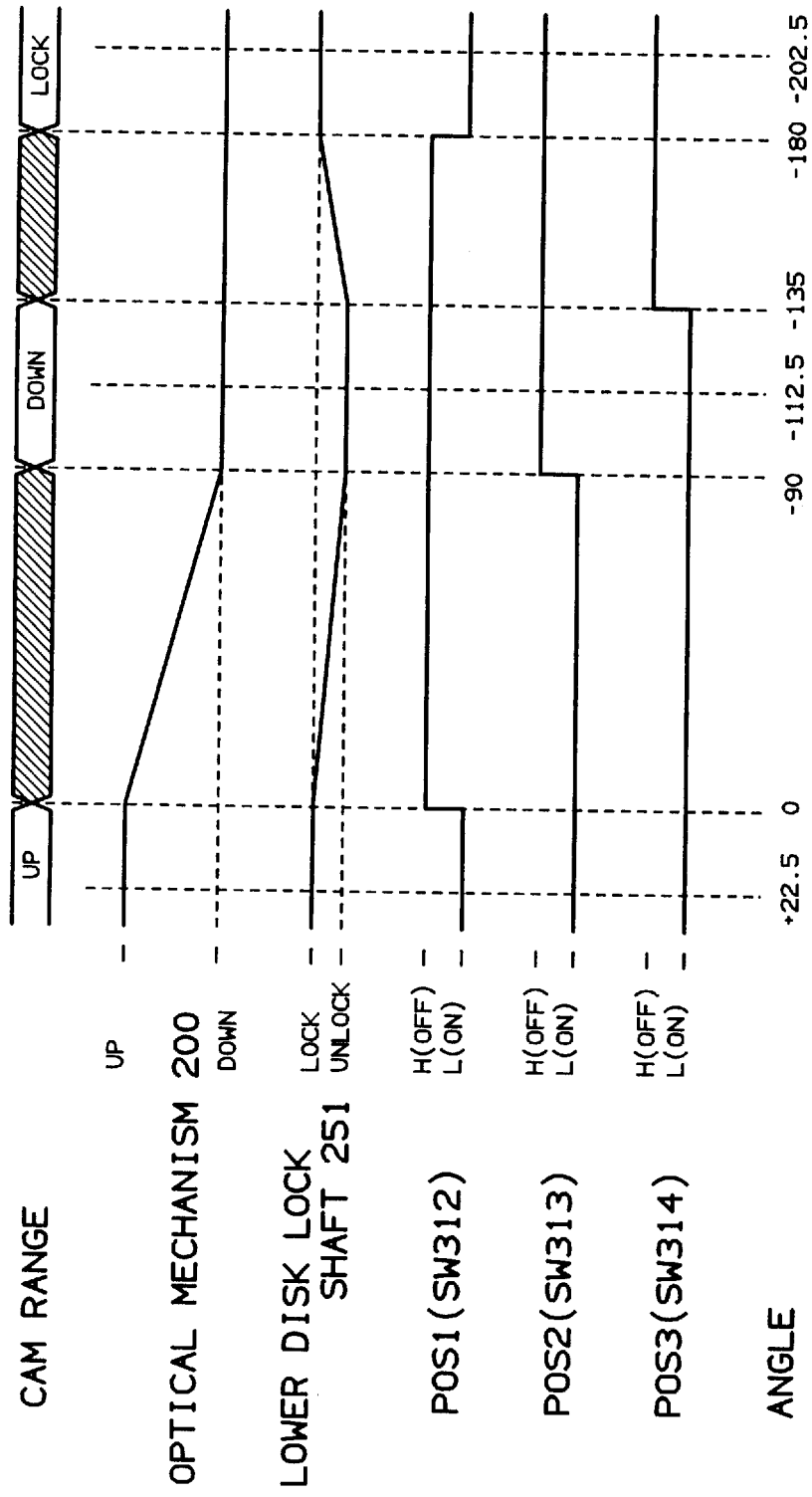
FIG. 12 is a timing chart indicating a relationship between optical mechanism 200, lower disc-lock shaft 251, and a cam angle of cam member 110.

Referring now also to FIG. 12, a rotational angle of zero for cam 260 is defined as the angle at which rotation of cam 260 lifts optical mechanism 200 into its upper position. Cam groove 101 has a spiral shape so that optical mechanism 200 is advanced when cam member 110 rotates through angles of 0° to −90°. However, there are also non-advancing portions of cam groove 101 where the optical mechanism remains stationary while cam member 101 rotates through angle ranges of +22.5° to 0°, and −90° to −202.5°.

Referring now to FIGS. 9 and 12, angles of rotation of cam 260 between zero and +22.5°, otherwise known as the UP range, maintains optical mechanism 200 in the upper position and lower disc-lock shaft 251 in the lock position. Switches 312–314 are all turned on, rendering signals POS 1–3 all at a state identified in FIG. 9 as "L" (hereinafter "H" and "L" represent high and low signal level states respectively).

When cam 260 rotates from a cam angle of zero to −90°, optical mechanism 200 moves from its upper to its lower position, while lower disc-lock shaft 251 similarly descends from its lock position to an unlock position. During this time, switch 312 is off, and POS 1 signal is "H".

Referring now to FIGS. 10 and 12, at rotational angles between −90° and −135°, otherwise known as the DOWN range, cam 260 turns switches 312 and 313 off, and POS 1 and POS 2 signals are "H". Optical mechanism 200 stays in its lower position while lower disc-lock shaft 251 stays in the unlock position.

Referring now to FIGS. 11 and 12, rotation of cam 260 negatively past −135° turns switch 314 off, rendering all of POS signals 1–3 signals "H". During this interval, lower disc-lock shaft 251 rises, returning to the lock position when cam member 110 reaches the −180° position. When cam 260 rotates negatively past the −180° point, switch 312 turns on, and signal POS 1 changes to "L". While cam 260 is within the range −180° to −202.5°, otherwise known as the LOCK range, optical mechanism 200 remains in the down position while lower disc-lock shaft 251 remains in the lock position.

Figure 13:
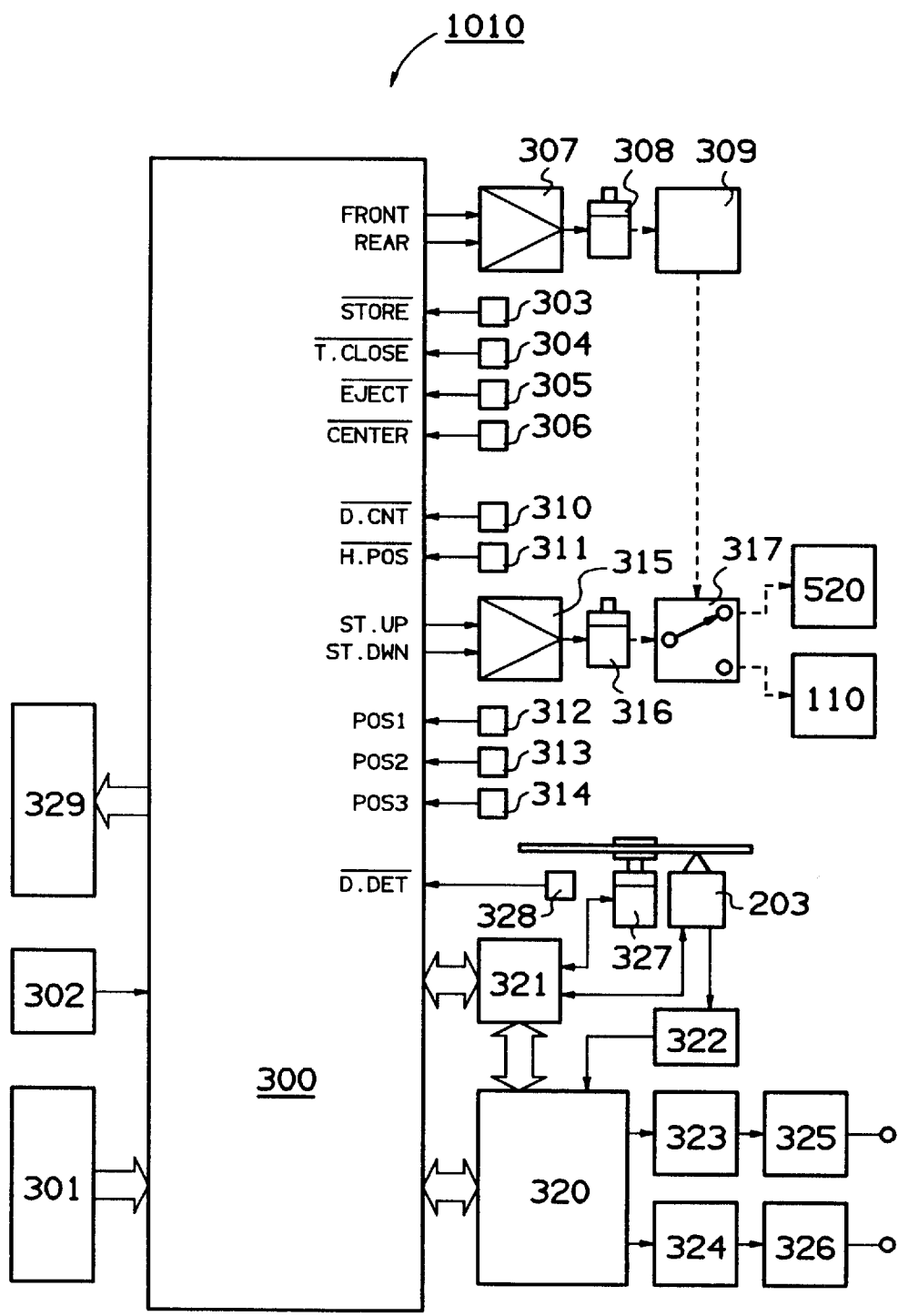
FIG. 13 is a block diagram indicating the control circuit for the present disc playback device.

Referring now to FIG. 13, a control circuit 1010 includes syscon 300. Syscon 300 contains conventional elements such as, for example, a read-only memory, a random-access memory, and interface circuitry. Syscon 300 may also incorporate one or more microprocessors.

Syscon 300 controls disc playback device 1000 according to an operating mode set by user input through a mode control panel 301. A backup power supply 302 connected to syscon 300, allows its random-access memory to retain data when the normal power supply is turned off or otherwise interrupted.

Limit switches 303–305 apply high "H" and low "L" signal levels to STORE, T.CLOSE, and EJECT (although these inputs are shown in the drawings as active upon receipt of a "0", they are referred to in the specification by the proper name) inputs of syscon 300, respectively. An "L" signal level at these inputs indicates that tray/carriage transport mechanism 309 has moved the selected carriage to the store, close, and eject positions, respectively. A photo-interrupter 306 detects that tray/carriage transport mechanism 309 has moved the selected carriage to the playback position by applying a signal at a CENTER input of syscon 300.

The STORE signal is responsive to the location of shuttle 28, such that STORE is "H" if shuttle 28 is prevented from returning to the rear of the device.

Syscon 300 applies control signals to a motor drive circuit 307 via FRONT and REAR outputs. A tray motor 308 rotates in forward and reverse directions according to output from motor drive circuit 307. Tray motor 308 drives tray/carriage transport mechanism 309.

According to the preferred embodiment of the invention, tray 20 moves toward the front (toward the eject position) of disc playback device 1000 when an "H" signal level is applied by the FRONT output. Tray 20 moves to the rear (toward the store position) of disc playback device 1000 when an "H" signal level is applied by the REAR output. An "H" level applied simultaneously by both FRONT and REAR outputs shorts the outputs of motor drive circuit 307, causing a magnetic braking effect in tray motor 308 (hereinafter referred to as "electromagnetic braking"). When both outputs are held at the "L" level, the outputs of motor drive circuit 307 are open.

Syscon 300 has several additional inputs for receiving input signals. A D.CNT input, connected to a photo-interrupter 310, receives an input signal indicating the position of stocker 50. An H.POS input, connected to a limit switch 311, receives an input signal that detects a reference position of stocker 50. Inputs POS 1–3 are connected to switches 312–314, which indicate the position of cam 260, described above.

Figure 14:
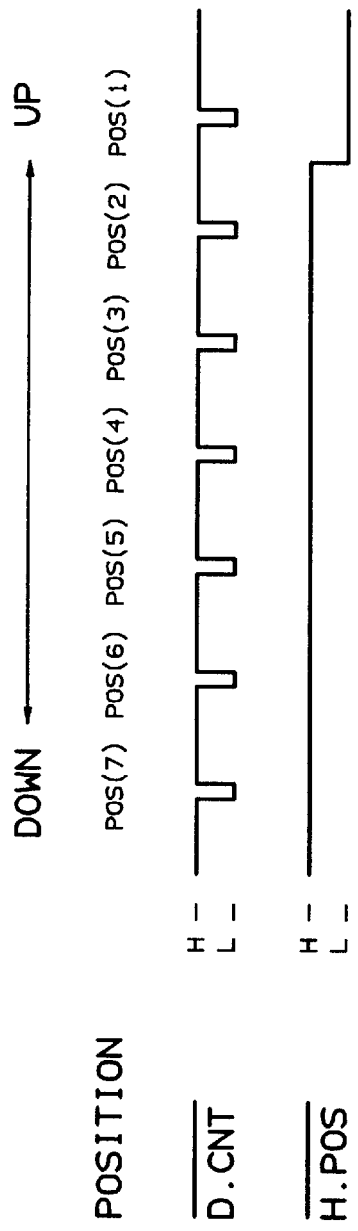
FIG. 14 is a timing chart indicating changes in a D.CNT signal and the H.POS signal relative to the position of the stocker.

FIG. 14 shows the changes in D.CNT signal and H.POS signal corresponding to the position of stocker 50. The D.CNT signal outputs a brief "L" each time stocker 50 brings a disc into its respective position Pos(n) (where n is the disc number). The H.POS input normally remains at "H", except when stocker 50 is roughly midway between Pos(1) and Pos(2), at which point H-POS becomes an "L".

Simultaneous reception of an "L" at both the H.POS and D.CNT inputs indicates to syscon 300 that stocker 50 is at Pos(1). This condition acts as a home-position signal. The remaining positions are detected by counting the D.CNT signal as stocker 50 moves in a given direction.

Returning now to FIG. 13, syscon 300 applies a signal level to an ST.UP output and an ST.DWN output. The ST.UP and ST.DWN outputs are connected to a motor drive circuit 315. Motor drive circuit 315 controls a stocker motor 316, which rotates in a reverse direction in response to the output from motor drive circuit 315. The rotary output of stocker motor 316 is transmitted, via a selection mechanism 317, to either sliding plate 520 or cam 110. Selection mechanism 317 is responsive to tray/carriage transport mechanism 309 based on the position of the selected carriage.

When a selected carriage 51–57 is in the store position, sliding panel 520 is selected. Stocker 50 moves upward when the ST.UP signal is "H" and moves downward when the ST.DOWN signal is "H". When both signals are "H," motor drive circuit 315 outputs are shorted, thereby applying a magnetic brake to stocker motor 316. When both signals are "L," motor drive circuit 315 outputs are disconnected, releasing the magnetic braking action.

Selection mechanism 317 transfers rotary input to cam 110 when a selected carriage is in a position other than the store position (e.g., the playback or eject positions). If the ST.UP signal is "H", cam 110 turns clockwise, moving optical mechanism 200 downward. If the ST.UP signal is "H," cam 110 turns counter-clockwise, moving optical mechanism 200 upward.

Syscon 300 also has a D.DET input to which signals are applied by a disc sensor 328 to register in memory the presence of a disc 1 in a selected carriages.

Optical head 203 is movably connected to optical mechanism 200. Optical head 203 uses a laser to read recorded information from a disc, generating a playback signal responsively to information recorded therein. The playback signal is applied to signal processor circuit 320 via a RF amplifier 322. Signal processor circuit 320 generates left and right channel audio data, Lch and Rch, respectively, following EFM demodulation, de-interleaving and error correction to the raw signal. Audio data are sent to digital-to-analog converters 323 and 324, respectively, for digital-to-analog conversion. The analog output signals are applied to low pass filters 325 and 326, respectively.

Syscon 300 connects to a servo signal processor circuit 321, which controls a focus servo, a tracking servo and a feed servo on optical head 203. Servo signal processor circuit 321 also controls a CLV servo of a spindle motor 307.

The operation of syscon 300 in conjunction with the remaining elements of the disc playback device are shown in the flowcharts of FIGS. 15–26, and the corresponding time charts shown in FIGS. 27–33. In the flowcharts, "n" refers to the selected disc number (carriage number) set responsive to a disc selection key, while "m" refers to the current position of stocker 50. Flag(m) indicates the presence of a disc on the $m^{th}$ storage position of stocker 50, where m is an index indicating the storage position number (e.g. Flag(3)=1 indicates that a disc is present in third carriage 53).

Figure 15:
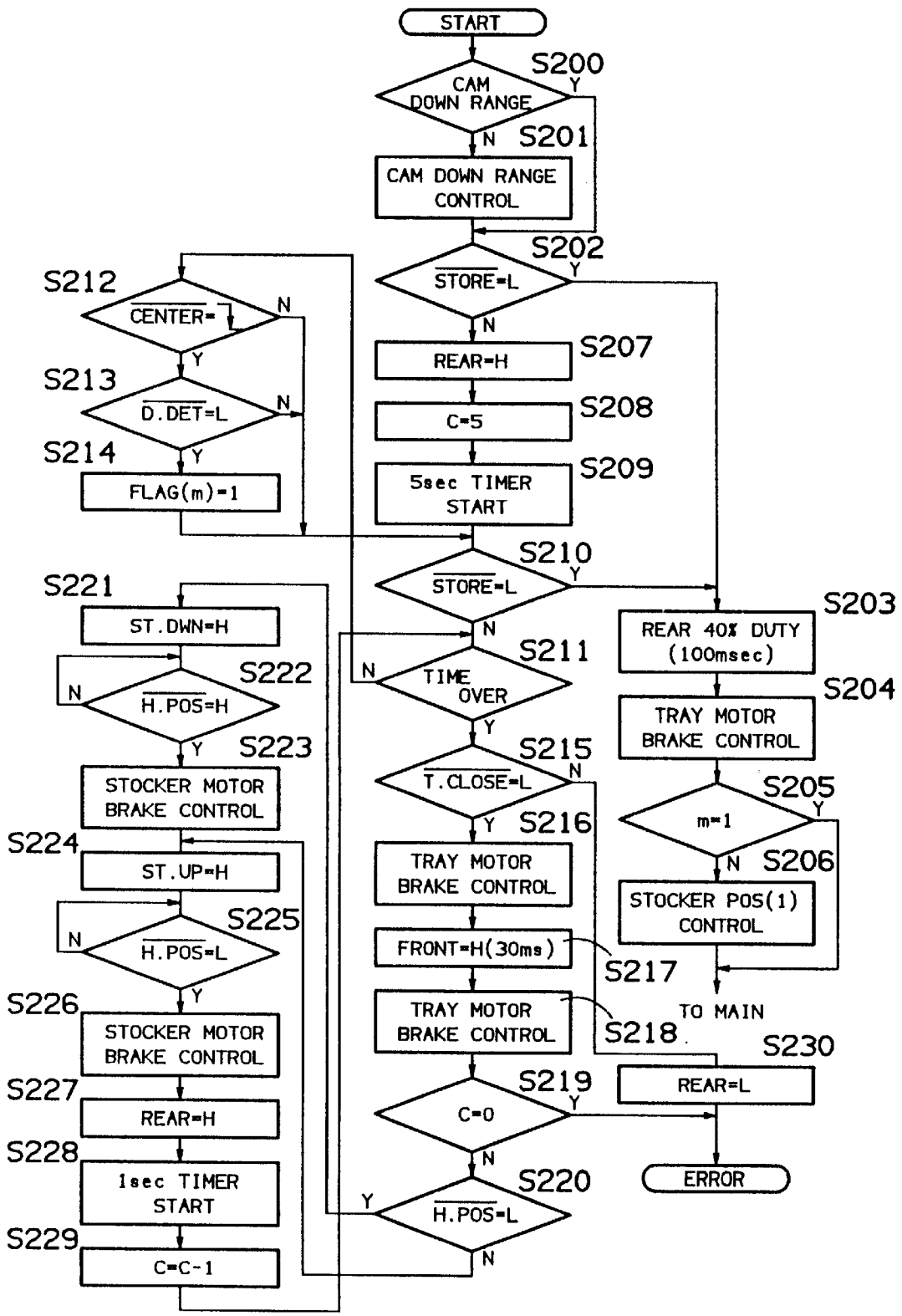
FIG. 15 is a flowchart for the initialization routine.

Referring now to FIG. 15, syscon 300 initialize the disc player when the power turns on. At a step S200, syscon 300 checks switches S1–S3 to check whether cam 110 is in the DOWN range. If not, cam 110 rotates into the cam range at a step S201 before proceeding to step S202.

Once in the DOWN range, syscon 300 checks the STORE signal to see if the carriage is in the store position (STORE= "L") at step S202. If a carriage is present, then at step 203 signal REAR pulses for 100 msec with 10 msec periods at a 40 percent duty cycle (this process ensures that the carriage is completely withdrawn into the store position). Once complete, FRONT and REAR are set to "H" at step S204 for 50 msec to apply an electromagnetic brake to tray motor 308, preventing a belt portion of tray/carriage 309 from stretching.

Once the selected carriage is placed stably within stocker 50, syscon checks the value of m at step S205 to determine whether stocker 50 is in Pos(1). If m≠1, then stocker 50 moves to Pos(1) at step S206 before proceeding to the MAIN flowchart. Once in Pos(1), stability is provided by engagement pieces 584L and 584R of tandem-motion member 58 with carriage 57, as well as upper disc lock shaft 250, which passes through spindle holes 163 of any discs located on carriages 52–57.

If the selected carriage is not in the store position at step S202 (STORE="H"), then REAR is set to "H" at step S207, causing tray 20 to retract from the eject position and shuttle 28 to return the selected carriage to the store position. A marker C is set to 5 at step S208, and a five second timer is activated at a step S209.

When the selected carriage passes the playback position (FIG. 3), signal CENTER falls at step S212 and syscon 300 checks signal D.DET at step S213 to determine whether a disk is present. If a disc is present on the carriage (D.DET= "L"), then FLAG(m) is set to "1" and control returns to proceeds step S210. When the selected carriage returns to the store position and signal STORE becomes "L", then syscon 300 proceeds to step S203 described above.

If, however, shuttle 28 does not return to the store position (STORE="H") with in the allotted 5 seconds, then control proceeds to step S215 to determine whether the tray is in the close position. If not (T.CLOSE="H"), then syscon 300 assumes that tray 20 is jammed and cannot return to the close position. Signal REAR is returned to "L" at step S230, an error message is indicated on the display, and action is halted.

If, however, the tray is in the close position (T.CLOSE= "L"), then it is assumed that shuttle 28 is disengaged from carriage cutout 168 and, instead, is engaged with carriage front surface 168' (FIG. 7). Thus, although the engagement of shuttle 28 with front surface 168' returns the selected carriage to stocker 50, front surface 168' similarly prevents shuttle 28 from returning to the rear of the device. In this state, shuttle 28 is unable to move carriages out of stocker 50.

In order to reconnect shuttle 28 in cutout 168, an electromagnetic brake is applied to tray motor 308 at step S216 to avoid possible motor overload. At step S217, syscon 300 applies a "H" FRONT signal for 30 msec, separating shuttle 28 from carriage front surface 168'. An electromagnetic brake is applied to tray motor 308 at step S218 for 50 msec to stop further motion of shuttle 28.

At step S219, syscon 300 checks count value C, initially set at C=5 at step S208. If C≠"0", then stocker moves to a position between Pos(1) and Pos (2), where syscon will attempt to re-engage shuttle 28 with cutout 168 as follows.

Syscon 300 checks H.POS at step 220. If "L", stocker 50 lowers (ST.DWN="H") at step S221 until it is disposed between Pos (1) and Pos (2) (H.POS changes to "H" at step S222). Electronic braking is applied to the stocker at step S223. At step S224, stocker 50 raises (ST.UP="H") until, at step S226, H.POS becomes "L". If signal H.POS is "H" at step S220, then syscon 300 raises stocker 50 in steps S224–S226 as described above.

Syscon 300 sets signal REAR to "H". moving shuttle 28 toward the rear of the device at step S227. A one-second timer is initiated at step S229, and count value C is decreased by one at step 229. Syscon 300 returns control to step S211 described above.

By moving toward the rear of the device, shuttle 28 is interposed between carriage 51 and carriage 52. When it reaches cutout 168, store position detection switch 303 (FIG. 13) turns on (STORE="L") and syscon 300 proceeds to step S203 described above. If shuttle 28 cannot engage cutout 168 when the one second timer elapses, syscon 300 repeats steps S215–S229. Each repeated stocker positioning creates a slight difference in the relative positioning of shuttle 28 and carriages 51, 52, increasing the probability that shuttle 28 will engage cutout 168. If shuttle 28 fails to engage after five tries, syscon 300 detects count value C=0 at step S219, displays an error message and halts operation.

Figure 16:
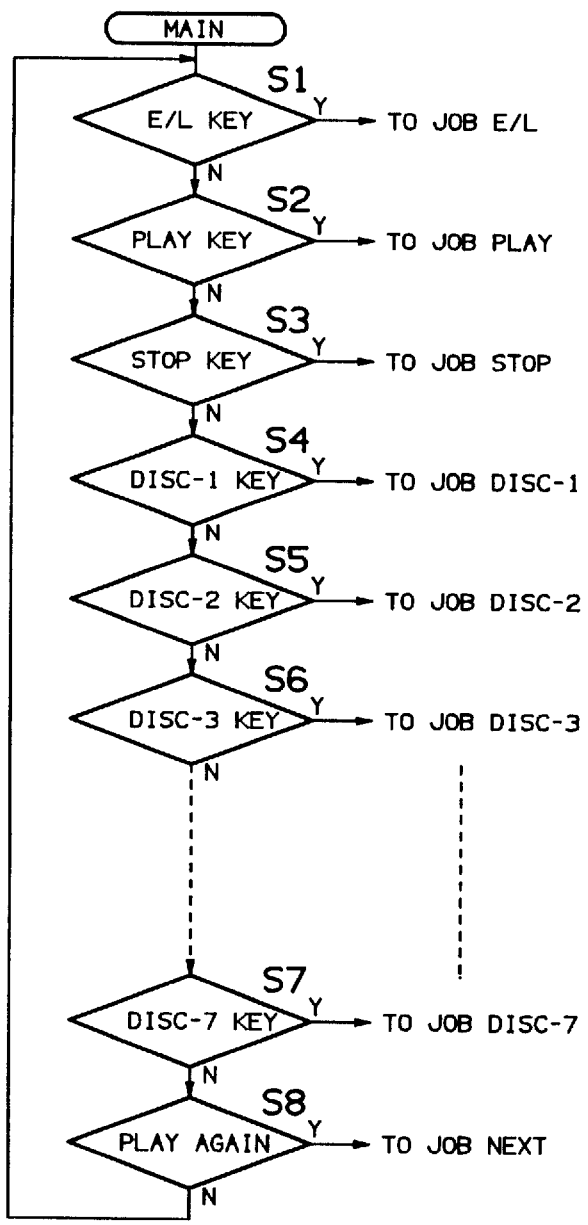
FIG. 16 is a flowchart showing the MAIN routine.

Referring to FIG. 16, if the initialization sequence completes successfully, control passes to the MAIN flowchart. The following is a description of the operations corresponding to key entry in each of the modes.

Referring now to FIG. 16, syscon 300 follows the operation in the MAIN flowchart, in which syscon 300 awaits depression of a command key, or the completion of the playback mode for a disc. Each of the functions shown in FIG. 16 is referred to in the detailed flow descriptions of later figures. Thus, further description of FIG. 16 is unnecessary, and is omitted.

Figure 17:
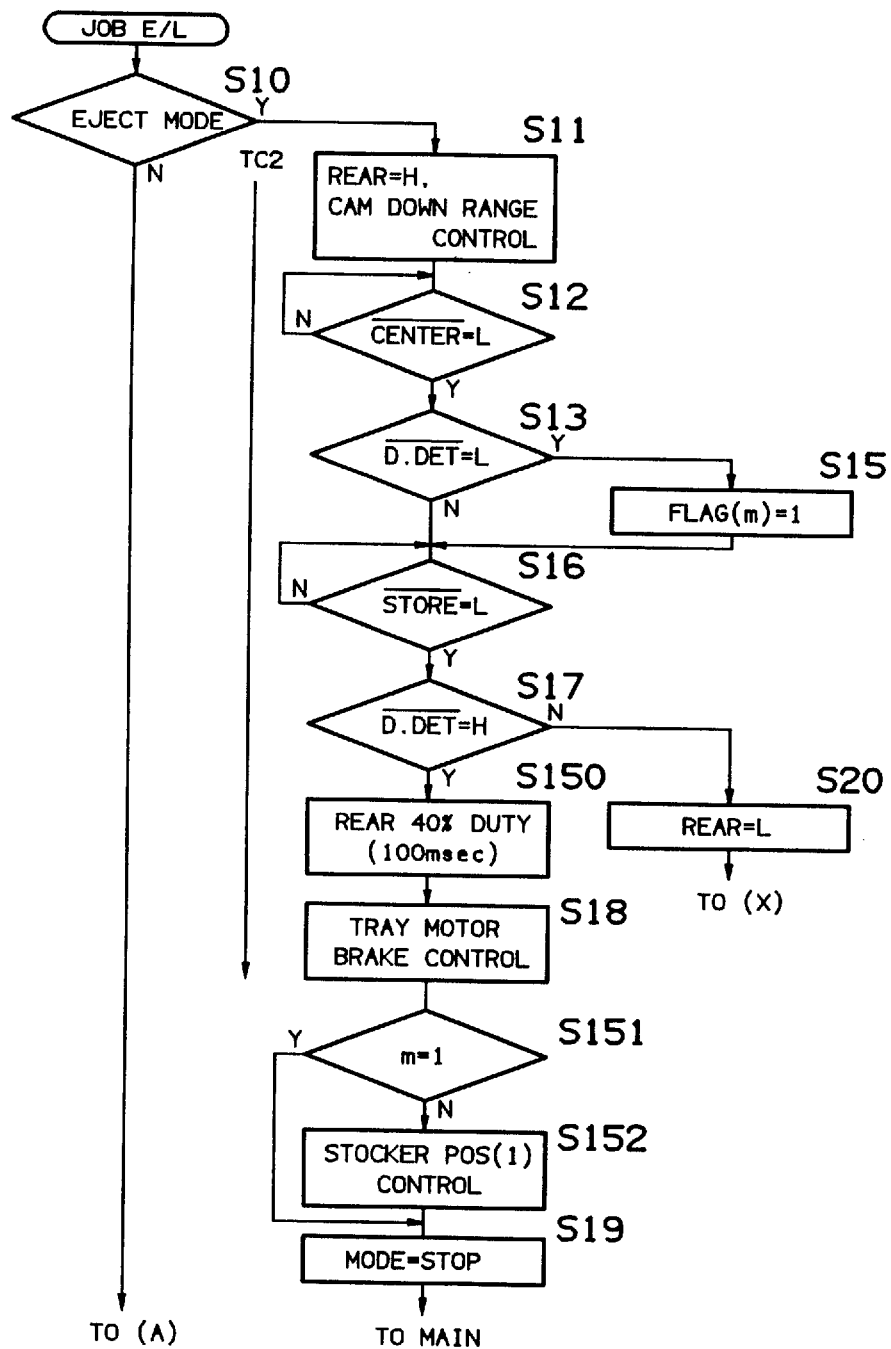
FIG. 17 is a flowchart showing the JOB EJECT routine.
Figure 18:
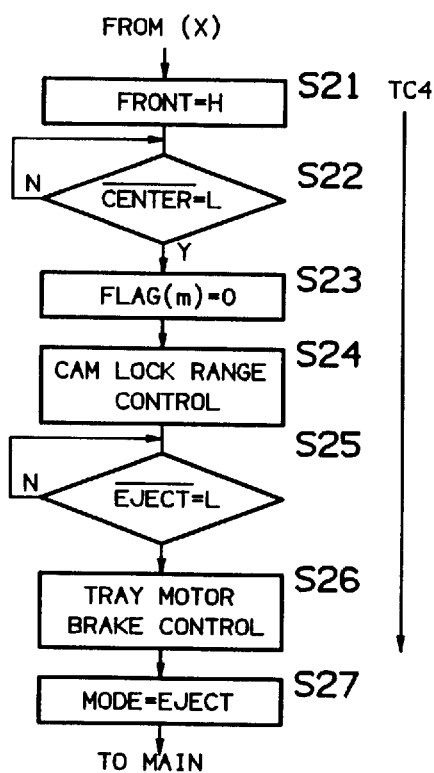
FIG. 18 is a flowchart showing the JOB EJECT routine.
Figure 19:
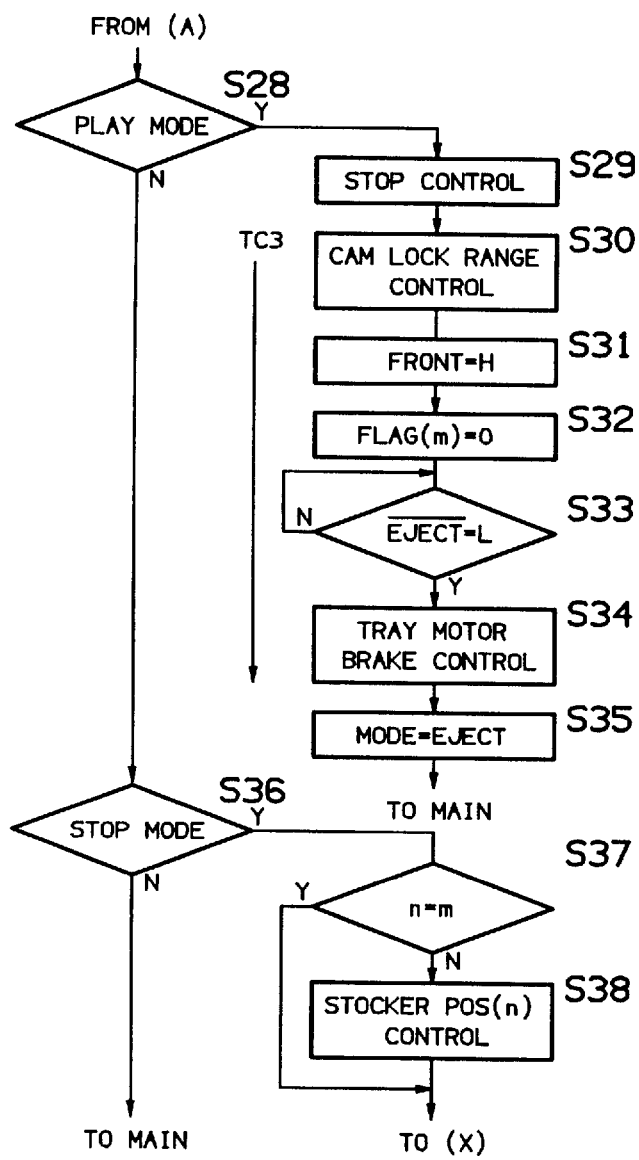
FIG. 19 is a flowchart showing the JOB EJECT routine.

Referring now to FIGS. 17–19, when an eject key is pressed while tray 20 is in the eject position, control by syscon 300 passes from step S1 of FIG. 16 to steps S10 and S11 of FIG. 17. Step S10 is the first step in a JOB EJECT routine. Beginning with step S11, The JOB EJECT routine proceeds through operation TC2 of FIG. 27. Operation TC2 details how the device goes from the eject mode to the stop mode by returning the tray to the close position and the selected carriage to the store position.

In step S11, syscon 300 applies the "H" level is to the REAR output to retract tray 20 toward the close position. Simultaneously, cam member 110 rotates counterclockwise responsive to a "H" level to the ST.DWN output toward the DOWN range. This also moves lower disc-lock shaft 251 toward the unlock position (indicated in FIG. 1). When lower disc-lock shaft 251 arrives at the unlock position and POS 3 signal is set to "L" as a result of the rotation of cam 260, syscon 300 activates the electromagnetic brake for motor 316 by applying the "H" level to the ST.UP output to short motor drive circuit 315 for 50 msec. Following the first application of the brake, syscon 300 proceeds to step S12 unless cam member 110 over-rotates past the DOWN range.

If cam member 110 over-rotates beyond the desired range, syscon 300 applies the "L" level to the ST.DWN output, driving cam member 110 clockwise. When the POS 2 signal changes to "H," syscon 300 sets the ST.DWN signal to "H", magnetically braking stocker motor 316 for 50 msec.

At step S12, syscon 300 waits for the CENTER input signal to change to "L" in response to photo-interrupter 306. The CENTER input changes upon arrival of the selected carriage at the playback position. Once tray 20 is in the close position and the selected carriage disengages tray 20, switch 313 applies "L" to the CENTER output. Control passes to step S13 where syscon 300 determines if a disc is present in the selected carriage.

The presence (or lack thereof) of a disc in the selected carriage is indicated by the D.DET signal. If a disc is present (D.DET signal is "L"), FLAG(m) is set to "1" at step S15 before proceeding to step S16. At step S16, syscon 300 waits for the STORE signal to change to "L", which indicates that shuttle 28 and the selected carriage have returned to stocker 50.

On occasion, two discs may be placed accidentally into tray 20 while in the eject position. For example, if two discs were set in selected first carriage 51, the top disc would hit a rim 21 of the tray opening when the selected carriage moves from the playback position to the store position. Once selected carriage 51 withdraws to its store position, the top disc would fall into tray 20, jamming the device and damaging the disc when stocker 50 moves.

In order to prevent such damage, the present invention checks to ensure that tray 20 is clear before moving stocker 50. Following an "L" STORE signal, syscon 300 again checks the D.DET signal at step S17.

If the D.DET signal is "H" (no disc present in tray 20), signal REAR is pulsed for 10 msec at a 40% duty cycle at step S150. Control passes to step 18 (the last step of Operation TC2), where syscon 300 activates the electromagnetic brake for motor 316 by setting FRONT output signal to "H", shorting the input leads to stocker motor 316 for 50 msec.

At step S151, stocker 50 defaults to position Pos(1). First, the value of "m" is checked at step 151 to see if stocker 50 is already in Pos(1). If not, stocker 50 moves to Pos(1) at step 152 before proceeding to step S19, where a MODE variable is set to indicate a "STOP" mode and control returns to the MAIN routine of FIG. 16.

If D.DET signal is "L" at step S17, indicating the presence of a disc, syscon 300 sets REAR to "L" at step S20 and control passes to step S21 of FIG. 18. Beginning with step S21, the JOB EJECT routine proceeds through operation TC4 of FIG. 24. Operation TC4 details how the device secures the stocker prior to entering into the eject mode.

Referring now also to FIG. 18, at step S21, syscon 300 sets the FRONT signal to "H", moving selected first carriage 51 toward the playback position. CENTER input signal changes to "L", indicating arrival of selected first carriage 51 at the playback position, at a step S22. Once CENTER input signal changes to "L", syscon 300 resets FLAG(m) to "0" at a step S23.

At a step S24, syscon 300 moves cam member 110 to the LOCK range. ST.UP is set to "H," rotating cam member 110 clockwise to move lower disc-lock shaft 251 toward the lock position. Once lower disc-lock shaft 251 moves to the lock position and the POS 1 signal is "L", the ST.DWN output signal is set to "H" to brake stocker motor 316. In this state, the remaining discs in stocker 50 are secure, and will not shift due to shock or inclination of playback device 1000.

At step S25, syscon 300 waits for tray 20 to arrive at the eject position (EJECT="L"), at which time syscon 300 applies the "H" level to the REAR output and magnetically brakes tray motor 308 for 50 msec at step S26. At step S27, the MODE variable is set to indicate an "EJECT" mode and control returns to the MAIN routine.

Figure 29:
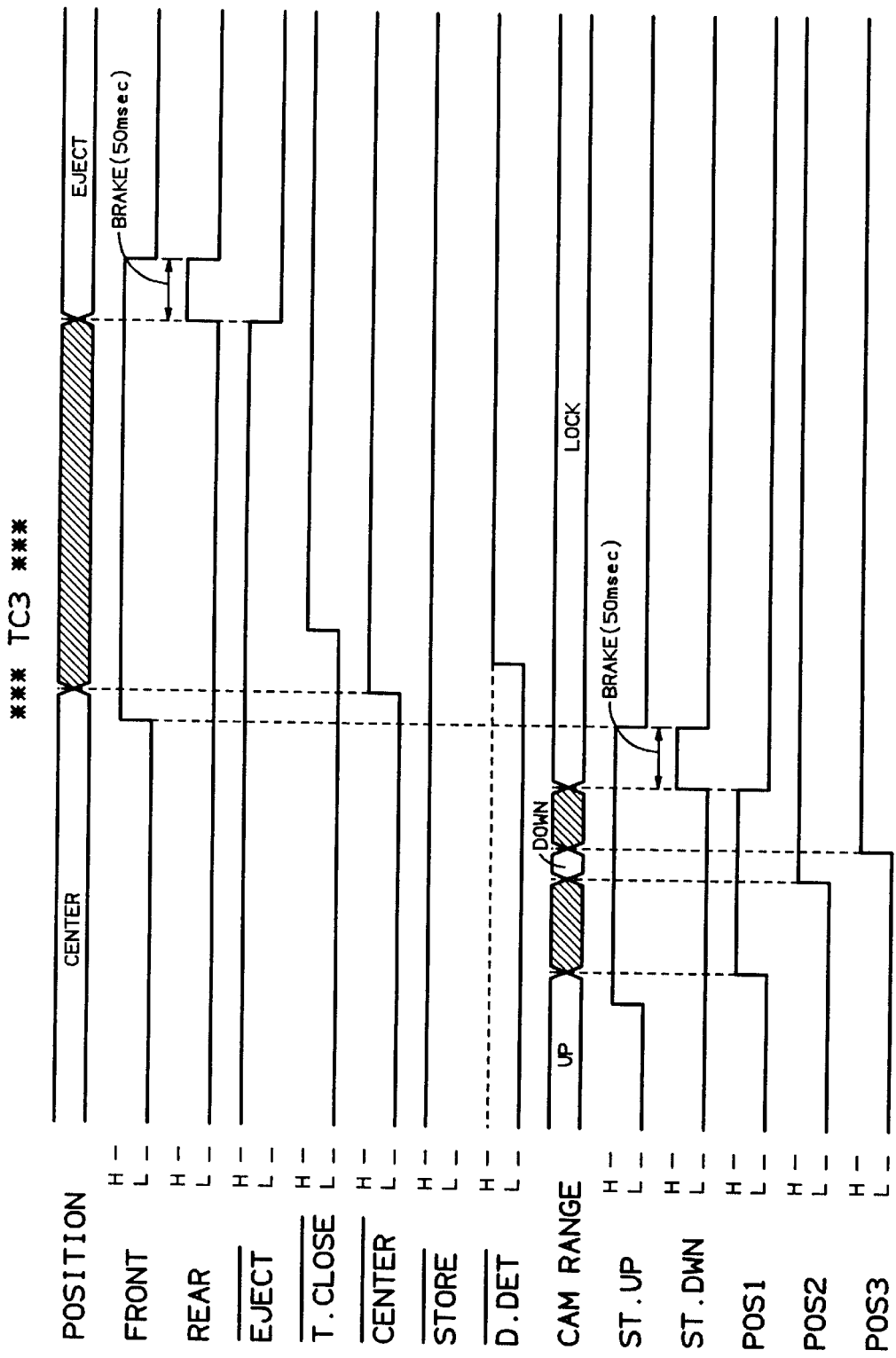
FIG. 29 is a timing chart TC3 used in describing a portion of the steps found in the flowchart in FIG. 19.

Referring now to FIGS. 19 and 29, when the eject key is pressed during a "PLAYBACK" mode, syscon 300 proceeds from step S1 of FIG. 16 through step S10 of FIG. 17 to steps S28 and S29 of FIG. 19. Disc playback halts at step S29 before the JOB EJECT routine proceeds through operation TC3 of FIG. 29. Operation TC3 details how the device secures the stocker prior to ejecting a disc from the playback position.

At step S30, syscon 300 applies an "H" level to the ST.UP output. Syscon 300 then rotates cam member 110 clockwise to bring optical mechanism 200 into the lower position and lower-disc-lock shaft 251 to the lock position. Once lower disc-lock shaft 251 arrives at the lock position and the POS 1 signal becomes "L", motor 316 magnetically brakes for 50 msec by a "H" ST.DWN signal.

Following braking, an "H" level signal is applied to the FRONT output at a step S31, moving tray 20 to the eject position. At step S32, FLAG(m) is reset to "0". After tray 20 arrives at the eject position (EJECT="L") at step S33, an "H" level at the REAR output magnetically brakes tray motor 308 for 50 msec at step S34. Finally, the MODE variable is set to indicate the "EJECT" mode and control returns to the MAIN routine of FIG. 16 in a step S35.

When the eject key is pressed during the STOP mode (all carriages 51–57 are in stocker 50), syscon 300 proceeds from step S1, through steps S10, S28, S36 to step S37, at which the selected disc number "n" is compared with the present disk number "m". If m=n, control proceeds to the flowchart of FIG. 18, described previously. If not, stocker 50 moves to Pos(n) prior to control proceeding to the flowchart of FIG. 18.

Figure 20:
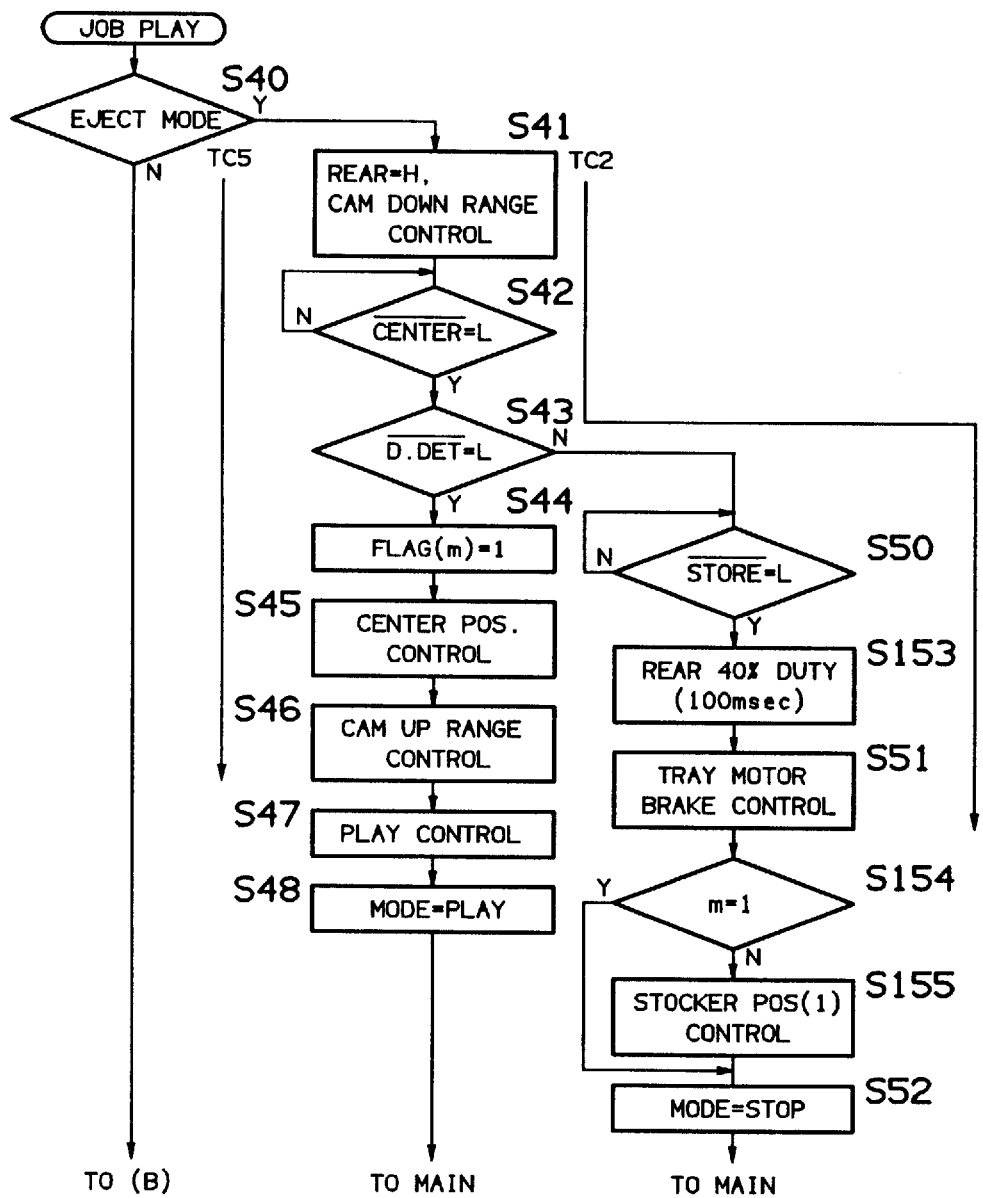
FIG. 20 is a flowchart showing the JOB PLAY routine.
Figure 30:
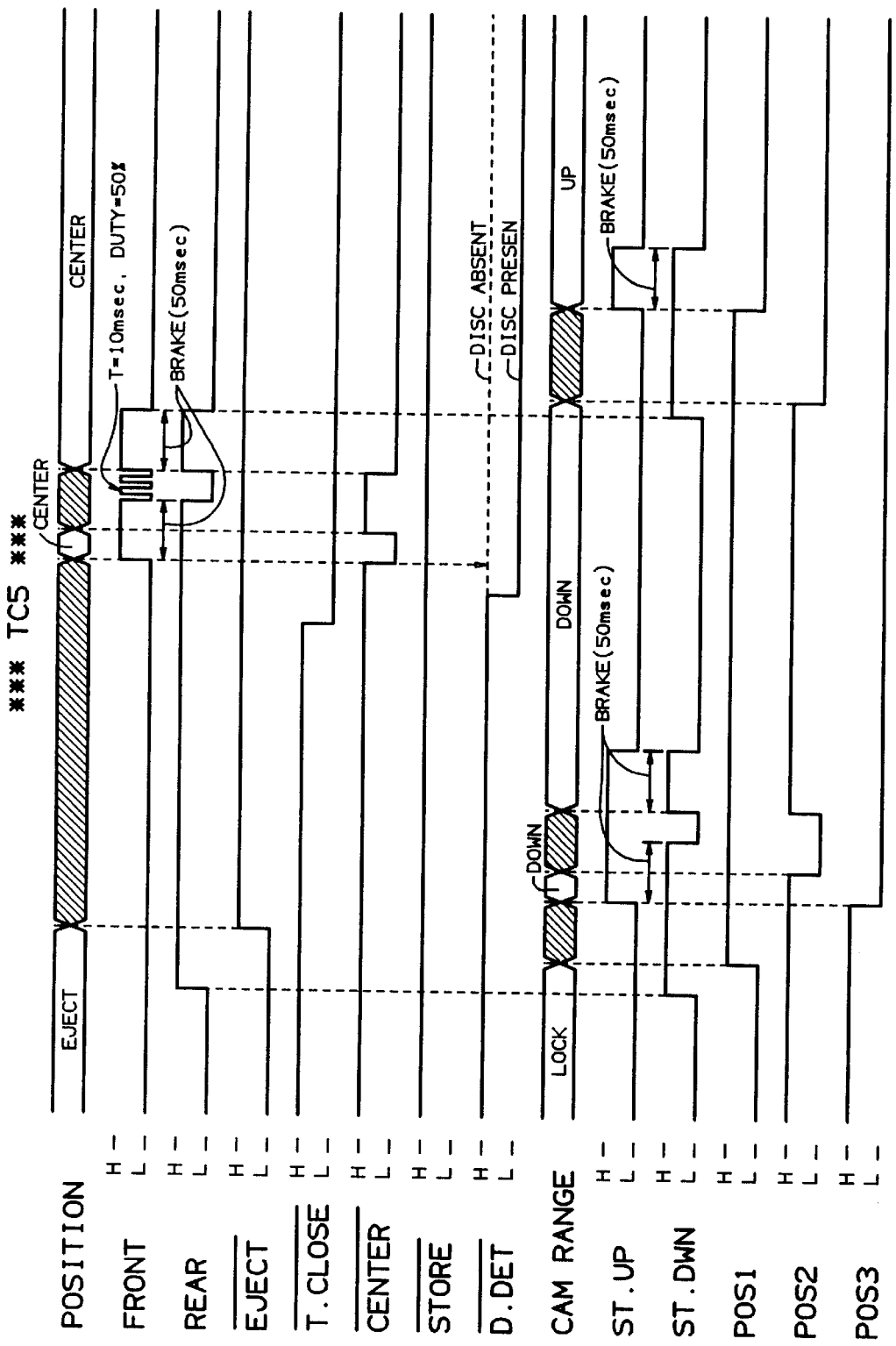
FIG. 30 is a timing chart TC5 used in describing a portion of the steps found in the flowchart in FIG. 20.

Referring now to FIGS. 20 and 30, when a play key is pressed during the "EJECT" mode, syscon 300 proceeds from step S2 of FIG. 16 to steps S40 and S41 of FIG. 20. At step S41, an "H" level to the REAR output moves tray 20 toward its close position. At the same time, cam member 110 rotates counterclockwise to the DOWN range, moving lower disc-lock shaft 251 downward from the lock position. When lower disc-lock shaft 251 arrives at the unlock position and the POS 3 signal is set to "L" as a result of the rotation of cam 260, syscon 300 activates the electromagnetic brake for motor 316 by applying the "H" level to the ST.UP output to short motor drive circuit 315 for 50 msec. Following the first application of the brake, syscon 300 proceeds to step S42 (unless cam member 110 over-rotates, thereby requiring restoration in the manner described previously).

At step S42, syscon 300 waits for the CENTER input signal to change to "L," in response to photo-interrupter 306. When the CENTER output signal changes to "L," control passes to step S43 where syscon 300 determines if a disc is present in the selected carriage. If a disc is present (D.DET signal="L") the corresponding FLAG(m) is set to "1" at step S44. Tray 20 moves to the playback position at step S45. When the CENTER input signal terminal state changes to "L," syscon 300 outputs an "H" signal level from the FRONT output braking tray motor 308 for 50 msec.

After braking, if tray motor 308 rotated past the playback position, an "L" level is output from the REAR output, and the FRONT output is cycled between "H" and "L" with a 50% duty cycle and a cycle period of 10 msec. Selected first carriage 591 thus moves in the eject direction at a low speed. Once the CENTER input signal changes to "L," an "H" level is output from both the FRONT and the REAR output terminals braking tray motor 308 for 50 msec.

At step S46, syscon 300 brings cam member 110 to the UP range, shown in FIG. 9. An "H" signal level is applied by the ST.DWN output, rotating cam member 110 counterclockwise. Optical mechanism 200 moves toward its upper position, whereupon the POS 1 signal changes to "L". Magnetic braking is activated by an "H" level signal output from the ST.UP. After the braking, signal processor circuit 320 and servo signal processor 321 are controlled to begin the playback procedure at step S47. Once disc playback begins, the MODE variable is set to indicate the "PLAY" mode and control returns to the MAIN routine at step S48.

If no disc is present in the selected carriage (D.DET is "H") at step S43, control proceeds to step S50, where syscon 300 waits for the selected carriage to arrive at the store position (STORE changes to "L"). When the selected carriage arrives at the store position, REAR signal pulses for 100 msecs at a 40% duty cycle at step S153. Control passes to step S51, where syscon 300 outputs an "H" level at the FRONT output to brake tray motor 308. At step S154, m is checked to see if stocker 50 is in Pos(1). If m=1, a MODE variable is set to indicate a "STOP" mode at step S52 and control returns to the MAIN routine of FIG. 16. If m≠1, stocker 50 moves to Pos(1) at step 155 before control passes to step S52.

Figure 21:
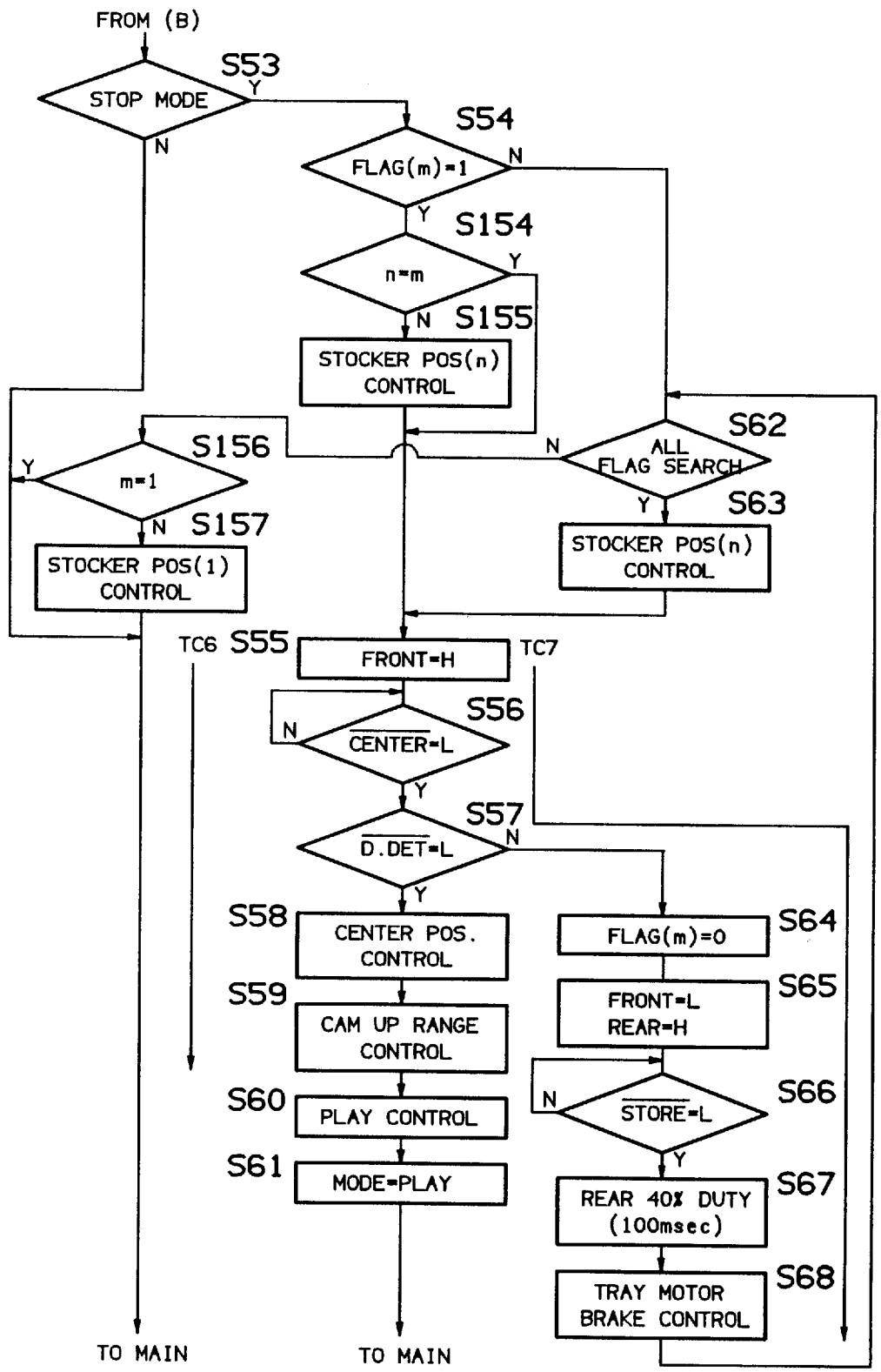
FIG. 21 is a flowchart showing the JOB PLAY routine.

Referring now to FIGS. 21, if the play key is pressed during the "STOP" mode, syscon 300 proceeds to a JOB PLAY routine, through steps S40 and S53, to step S54 at which the selected carriage is checked for the presence of a disc (Flag(m)=1).

If FLAG(m) was "0" at step S54, syscon 300 searches all flags sequentially from FLAG(1) to FLAG(7) at step S62. If a flag set to "1" is found, control proceeds to step S63, wherein stocker 50 moves to the position corresponding to the flag which was set to "1". Control then passes to step S55. If all of the flags are set to "0" in step S62, stocker 50 return to Pos(1) at steps S156 and S157, and control passes to the MAIN routine of FIG. 16. Pressing of the play key is, in effect, ignored.

If a disc is detected in the selected carriage at step S54, control passes to step S154 at which the selected disc number "n" is compared with "m". If they are identical, control proceeds to step S55. If not, stocker 50 moves to POS(n) prior to control proceeding with step S55.

Figure 31:
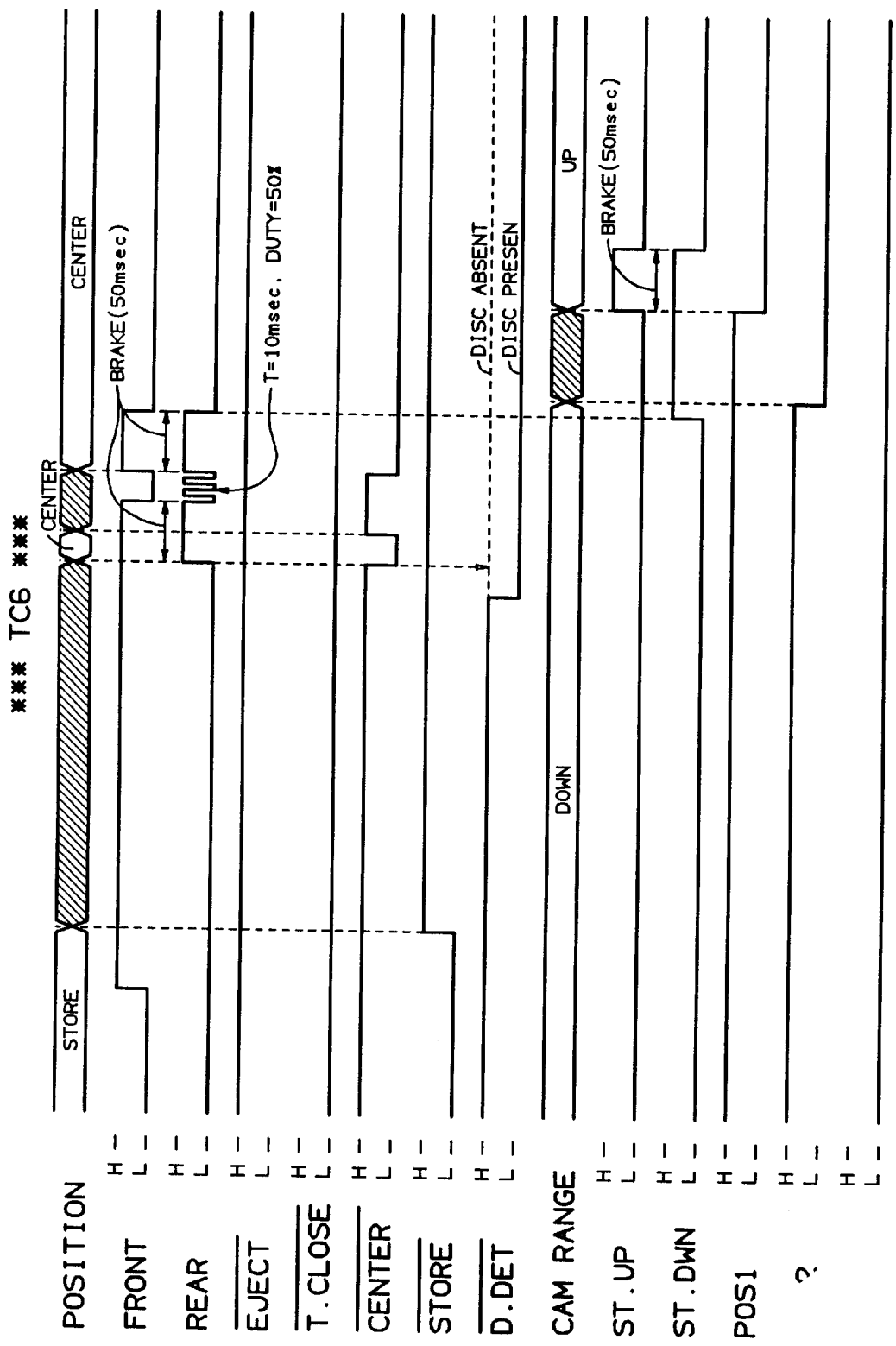
FIG. 31 is a timing chart TC6 used in describing a portion of the steps found in the flowcharts in FIGS. 21, 25 and 26.
Figure 32:
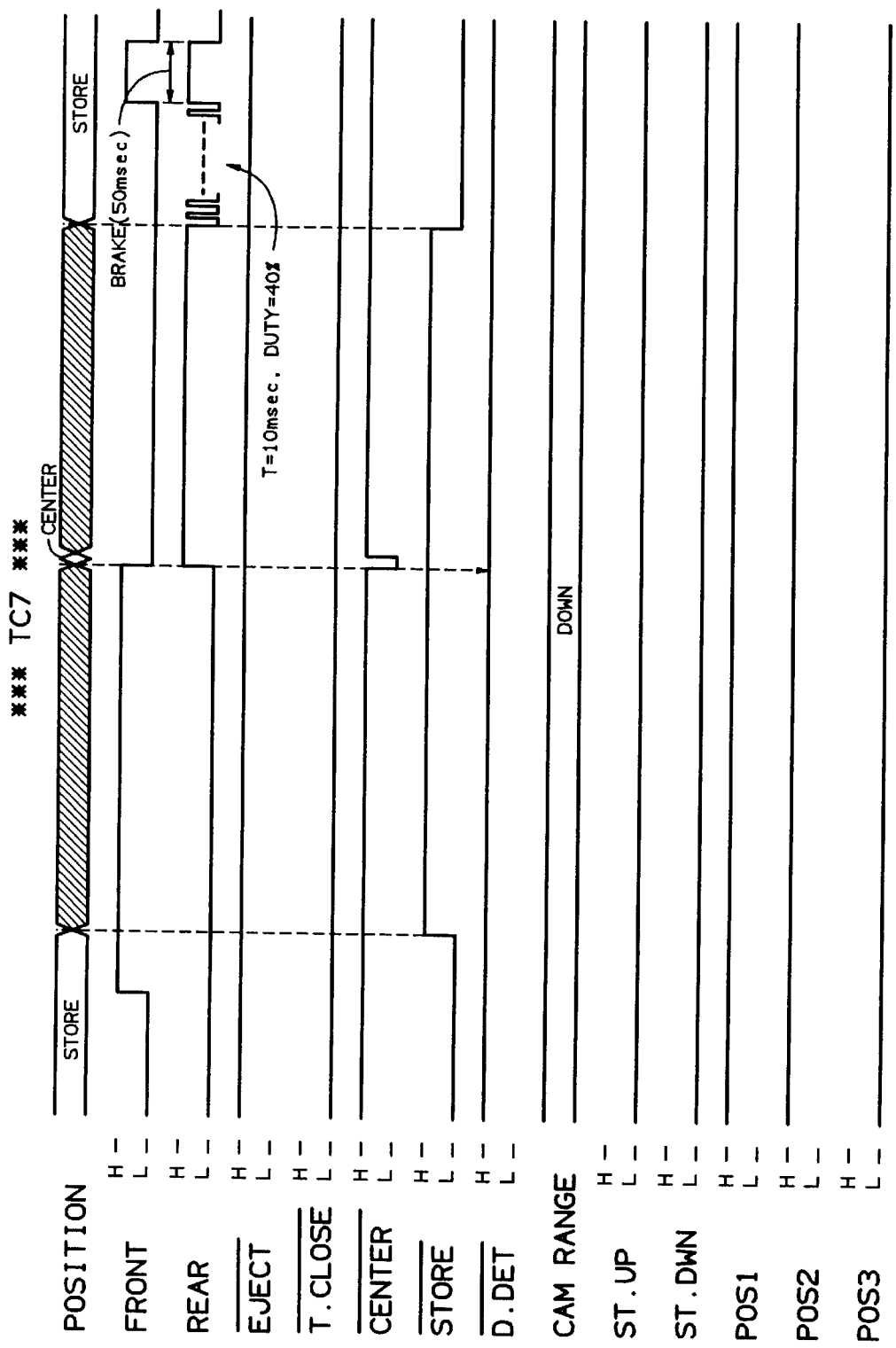
FIG. 32 is a timing chart TC7 used in describing a portion of the steps found in the flowcharts in FIGS. 21, 25 and 26.
Figure 33:
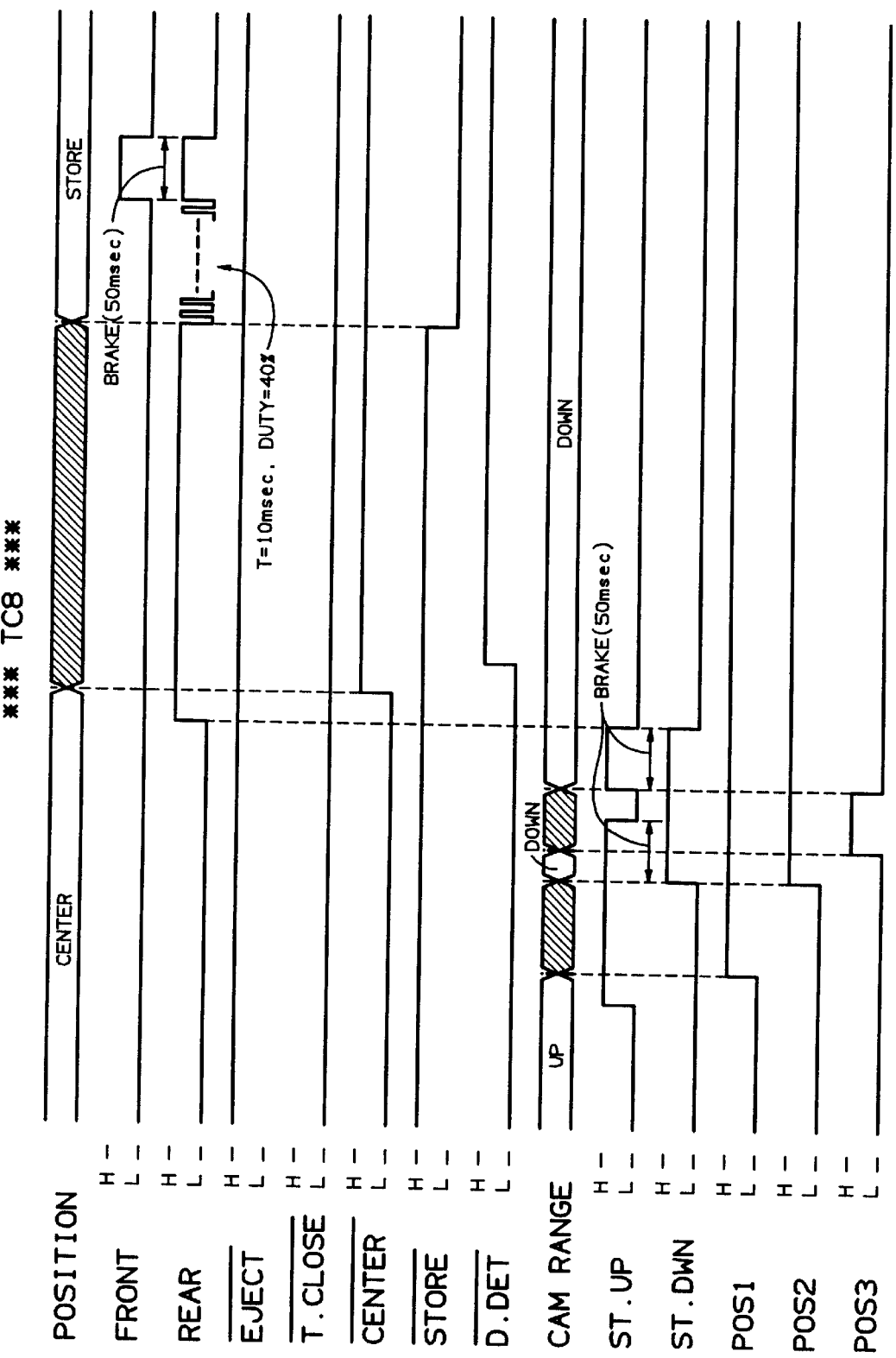
FIG. 33 is a timing chart TC8 used in describing a portion of the steps found in the flowcharts in FIGS. 22, 24 and 26.

At a step 55, operations TC6 and TC7 commence as shown in FIGS. 31 and 32, respectively. Operation TC6 involves transferring a disc from a selected carriage in stocker 50 to the playback position, from which playback commences. Operation TC7 is a branch of TC6, responsive to the absence of a disc in the playback position, for returning the selected carriage to stocker 50.

Syscon 300 outputs an "H" level signal at the FRONT output at step S55. The selected carriage moves out of stocker 50 toward the playback position until the CENTER input signal changes to "L" in step S56. Once the selected carriage arrives at the playback position, syscon 300 checks the D.DET input at step 57 to check if a disc 1 is present in the selected carriage. Step S57 thereby corrects data errors in FLAG(m) (possibly due to a power loss) to prevent unnecessary operation of the device.

If a disk is absent from the selected carriage (D.DET is "H"), syscon 300 sets FLAG(m) to "0" at step S64. At step S65, an "L" signal level is applied to the FRONT output and an "H" signal level is applied to the REAR output, returning the selected carriage to its store position. Once the selected carriage returns to the store position in step S66, REAR is set to "H" for 100 msec at 40% duty cycle. At step S68, syscon 300 applies an "H" level to the FRONT output terminal and brakes tray motor 308 for 50 msec. This step completes operation TC7, after which control returns to step S62.

If a disk is present in the selected carriage at step S57 (D.DET is "L") control proceeds to step S58, where syscon 300 moves the selected carriage to the playback position. At step S59 cam member 110 rotates until it is in the UP range. After the CENTER input signal changes to "L," syscon 300 outputs an "H" level at the REAR signal terminal, braking tray motor 308. If, the carriage overshoots the playback position, an "L" signal level is output from the FRONT output terminal and the REAR output is cycled, at a 50% duty cycle with a 10 msec cycle period, slowly bringing the selected carriage to the playback position. Once the CENTER input signal changes to "L," "H" levels are output at both the FRONT signal terminal and the REAR signal terminal for 50 msec to magnetically brake tray motor 308.

Next, syscon 300 outputs an "H" signal level at the ST.DWN output terminal. Cam member 110 rotates counterclockwise, moving optical mechanism 200 toward its upper position. When optical mechanism 200 arrives at the up position and the POS 1 signal changes to "L," braking is induced by an "H" level ST.UP. This step completes operation TC6, after which disk playback initiates at step S60. At step S61, the MODE variable is set to indicate the "PLAY" mode. Control then returns to the MAIN routine.

Figure 22:
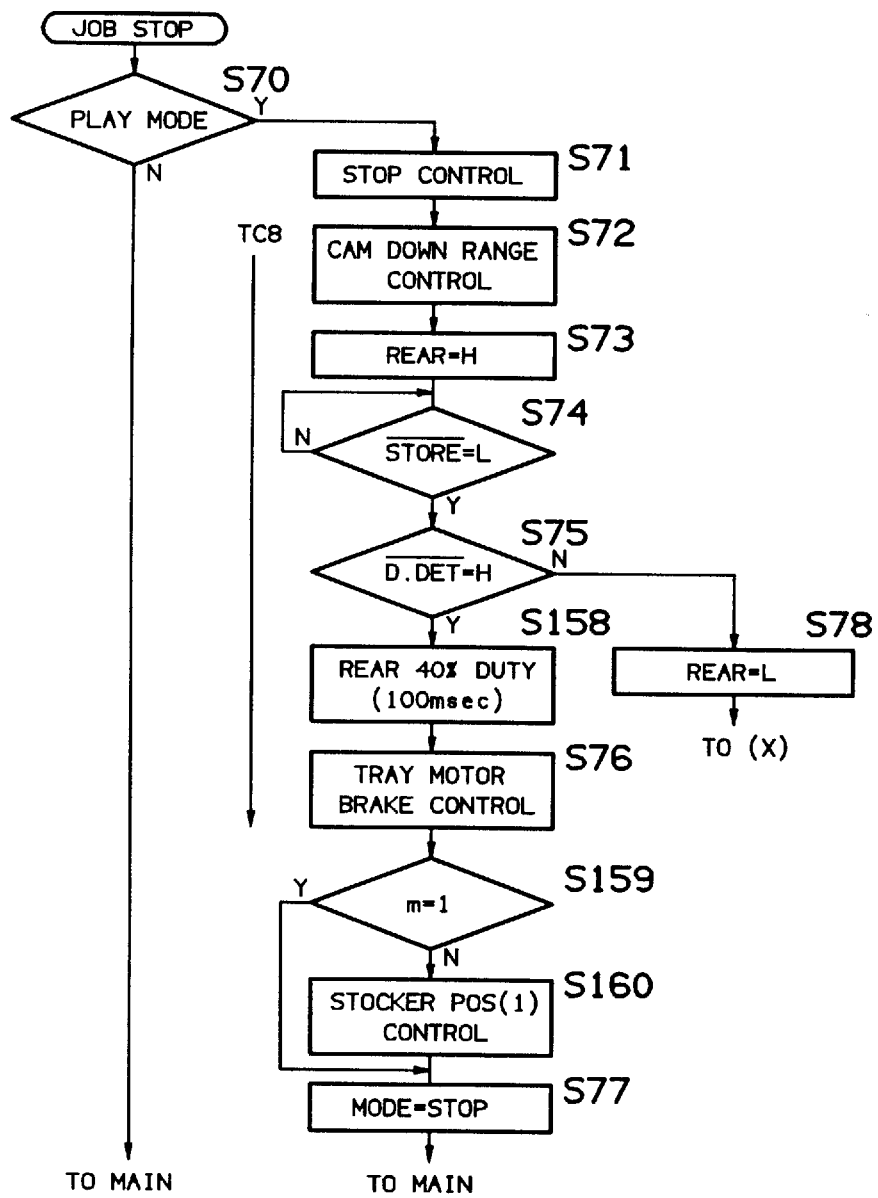
FIG. 22 is a flowchart showing the JOB STOP routine.
Figure 23:
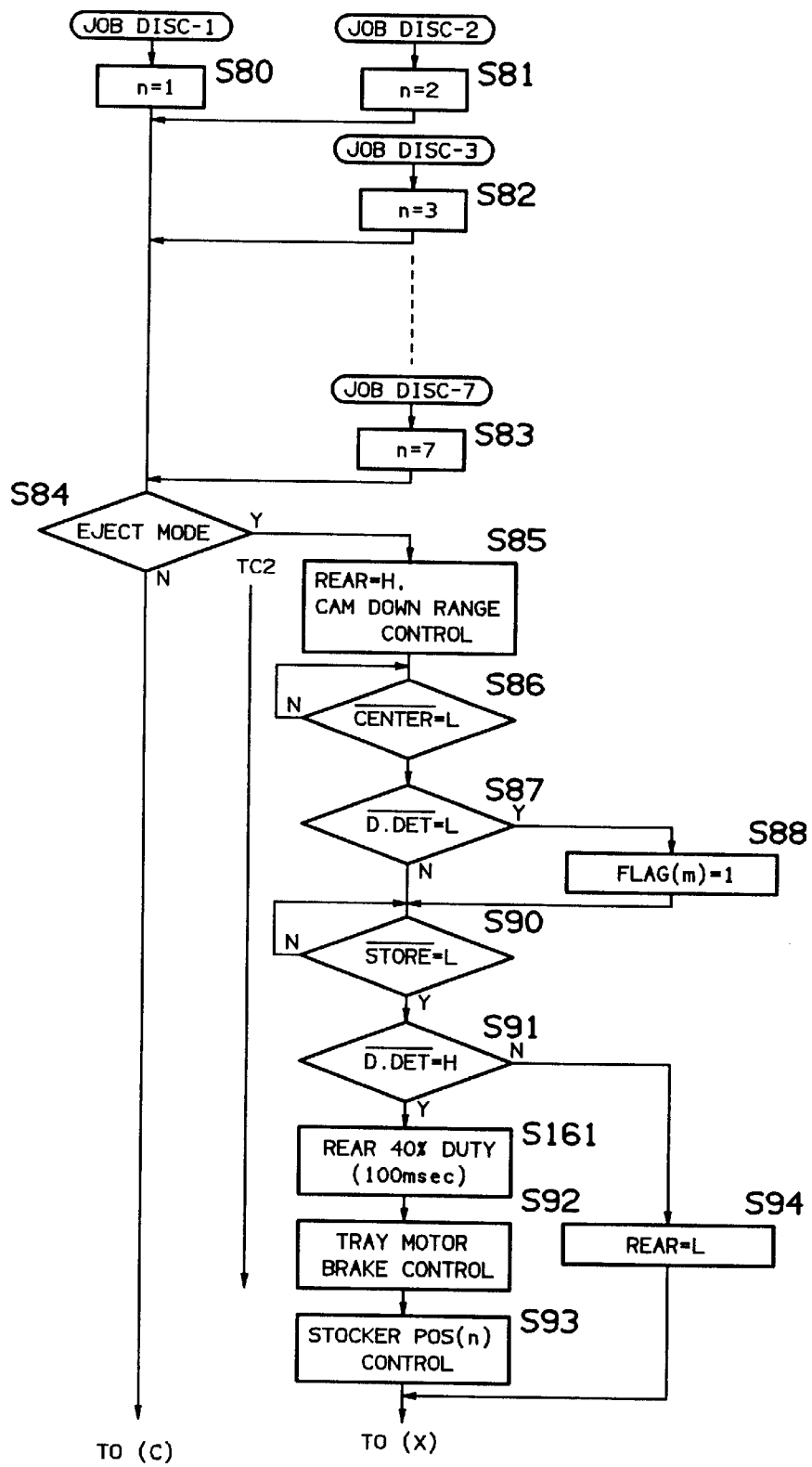
FIG. 23 is a flowchart showing the JOB DISC routine.

Referring now also to FIGS. 22 and 29, when the STOP key is pressed during the "PLAY" mode, syscon 300 proceeds from step S3 of FIG. 16 through steps S70 and S71 of FIG. 22. Disc playback halts at step S71. At a step S72, operation TC8 begins, in which the selected carriage returns to the store position from the playback position.

At step S72, cam member 110 rotates toward the DOWN range. Syscon 300 sets the ST.UP signal to "H". Cam member 110 rotates clockwise to move optical head 203 and lower disc-lock shaft 251 downward. Syscon 300 compensates for any overshoot as described previously.

When optical head 203 reaches the down position and the POS 2 signal changes to "H," syscon activates the electromagnetic brake. Then, at step S73, syscon 300 outputs an "H" signal level from the REAR output. Control passes to step S75 when the selected carriage arrives at the store position and the STORE input signal changes to "L" at step S74. At step S75, syscon 300 determines if a disc is present by the D.DET input signal. If no disc is present (D.DET signal is "L") at step S78, syscon 300 sets the REAR output signal to "L", whereby control proceeds to the flowchart of FIG. 18 as above.

If a disc is present (D.DET is "H") at step S75, control proceeds to step S158, at which REAR is set to "H" for 100 msec at a 40% duty cycle. At step S76, tray motor 308 magnetically brakes as described previously. This concludes operation TC8, and control proceeds to step S159.

At step S159, m is checked to determine if stocker 50 is at position Pos(1). If so, control passes to step S77, where the MODE variable is set to indicate the "STOP" mode and control returns to the MAIN routine. If stocker 50 is not in Pos(1) at step S159, syscon 300 moves stocker 50 to that position at step S160 prior to proceeding with step 77.

Referring now to FIG. 16, mode control panel 301 includes a plurality of DISC selection keys (not shown), one for each of the seven carriages 51–57 in stocker 50. When one of the DISC selection keys is pressed, syscon 300 branches from a corresponding one of steps S4 through S7 of FIG. 16 to a corresponding JOB DISC-N routine (steps S80–S83) shown in FIG. 23, where N is the number of the DISC selection key that is pressed. A constant n is set to "1", "2", . . . "7" according to the DISC selection key pressed.

If the disc selection key is depressed while the device is in the "EJECT" mode, control proceeds from step S84 to operation TC2 (movement from the eject position to the store position) through a series of steps S85–S88, S90–S92, S94, and S161. These steps are identical to steps S11–S13, S15–S18, S20 and S150, described with respect to FIG. 17, and need not be repeated here. After step S92 in which the tray motor 308 stops, stocker 50 moves to POS(n) at step S93. Control then proceeds to step S21 in FIG. 18, discussed above.

Figure 24:
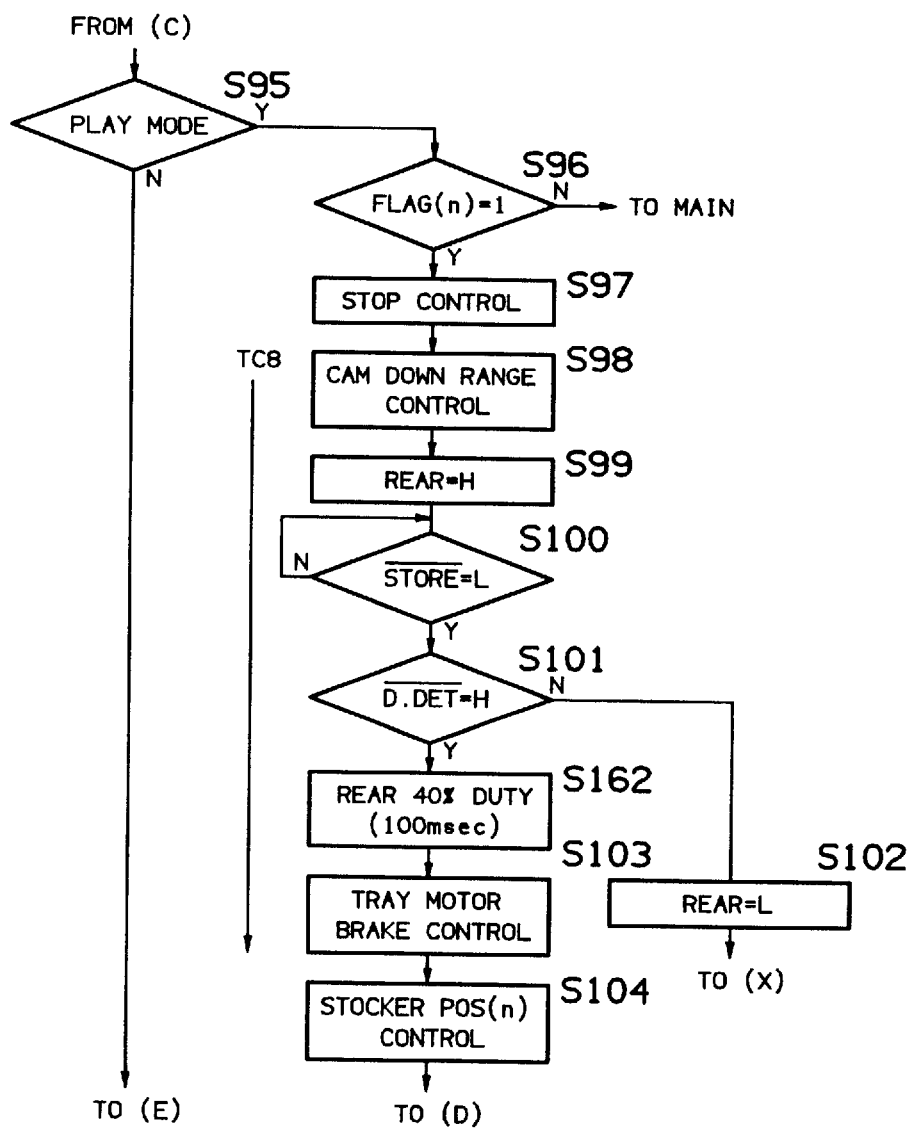
FIG. 24 is a flowchart showing the JOB DISC routine.

Referring now to FIG. 24, when a DISC key is pressed during "PLAY" mode, syscon 300 proceeds from the corresponding JOB DISC routine (the one of S81–S83 corresponding to the key pressed) to steps S84, S95 and S96, wherein FLAG(n) is checked for the presence of a disc (n is the DISC key number that was pressed). If no disc is present (FLAG(n) is "0") control immediately returns to the MAIN routine and the pressing of a DISC key is, in effect, ignored. If a disc is present (FLAG(n) is "1"), control proceeds to step S97 where syscon 300 halts disc playback.

Beginning with step S98, the routine proceeds through operation TC8 (movement from the playback position to the store position) through a series of steps S98–S103 and S162. These steps are identical to steps S72–S76, S78, and S158, described with reference to FIG. 22, and need not be repeated here. After step S103 in which the tray motor 308 stops, stocker 50 moves to POS(n). Control then proceeds to step S105 in FIG. 25.

Figure 25:
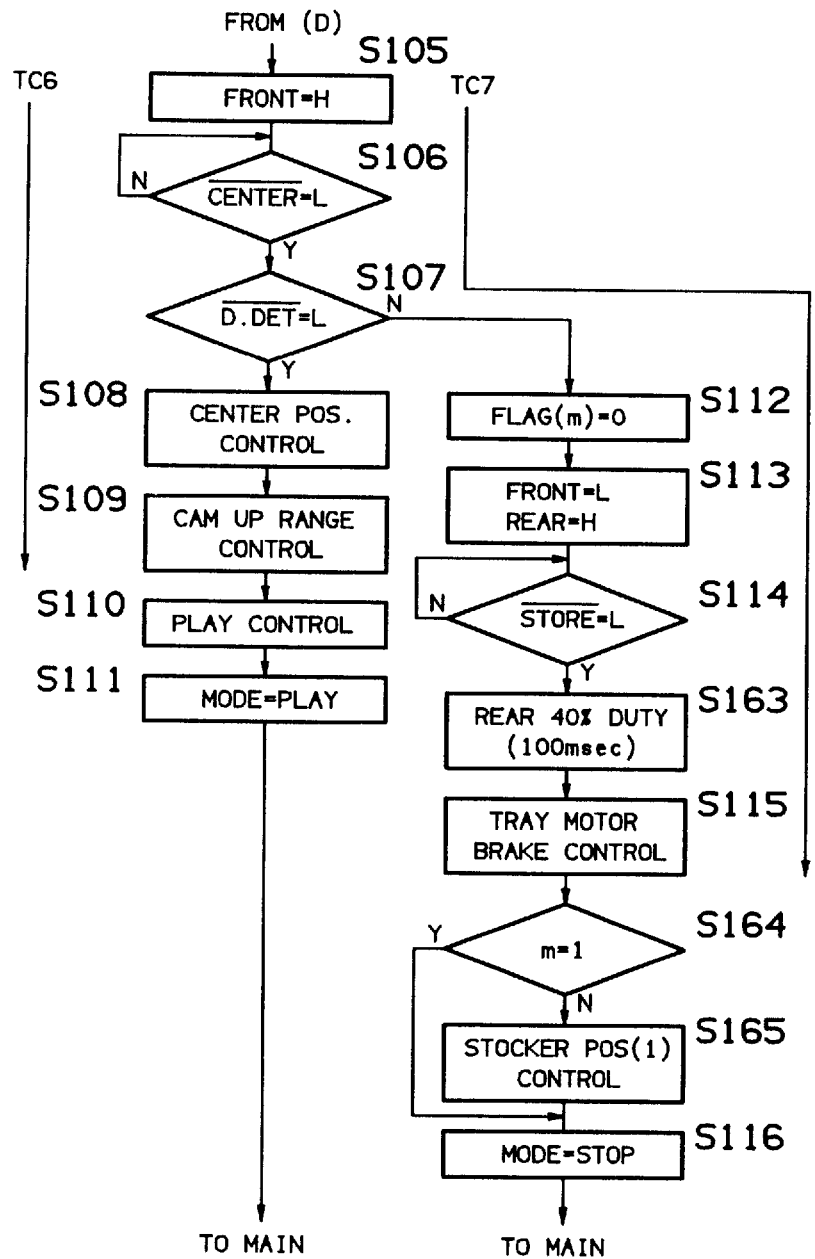
FIG. 25 is a flowchart showing the JOB DISC routine.

Referring now also to FIG. 25, both operations TC6 and TC7 commence at step 105–S115, which are identical to steps S55–S61 and S64–S68 of FIG. 21 (store position to playback position; if a disc is not in the selected carriage, return to store position), described above. If a disc is present in the selected carriage, control passes through path TC6 to steps S110 and S111, where the disc is played and the MODE variable is set to PLAY.

If a disc is not present in the selected carriage, control proceeds through TC7 to step 115, in which motor 308 is braked electromagnetically. If stocker 50 is not in Pos(1) at step S164, syscon 300 moves stocker 50 to that position at step S165 prior to proceeding with step 116. At step S116 the MODE variable is set to indicate the "STOP" mode and control returns to the MAIN routine.

Figure 26:
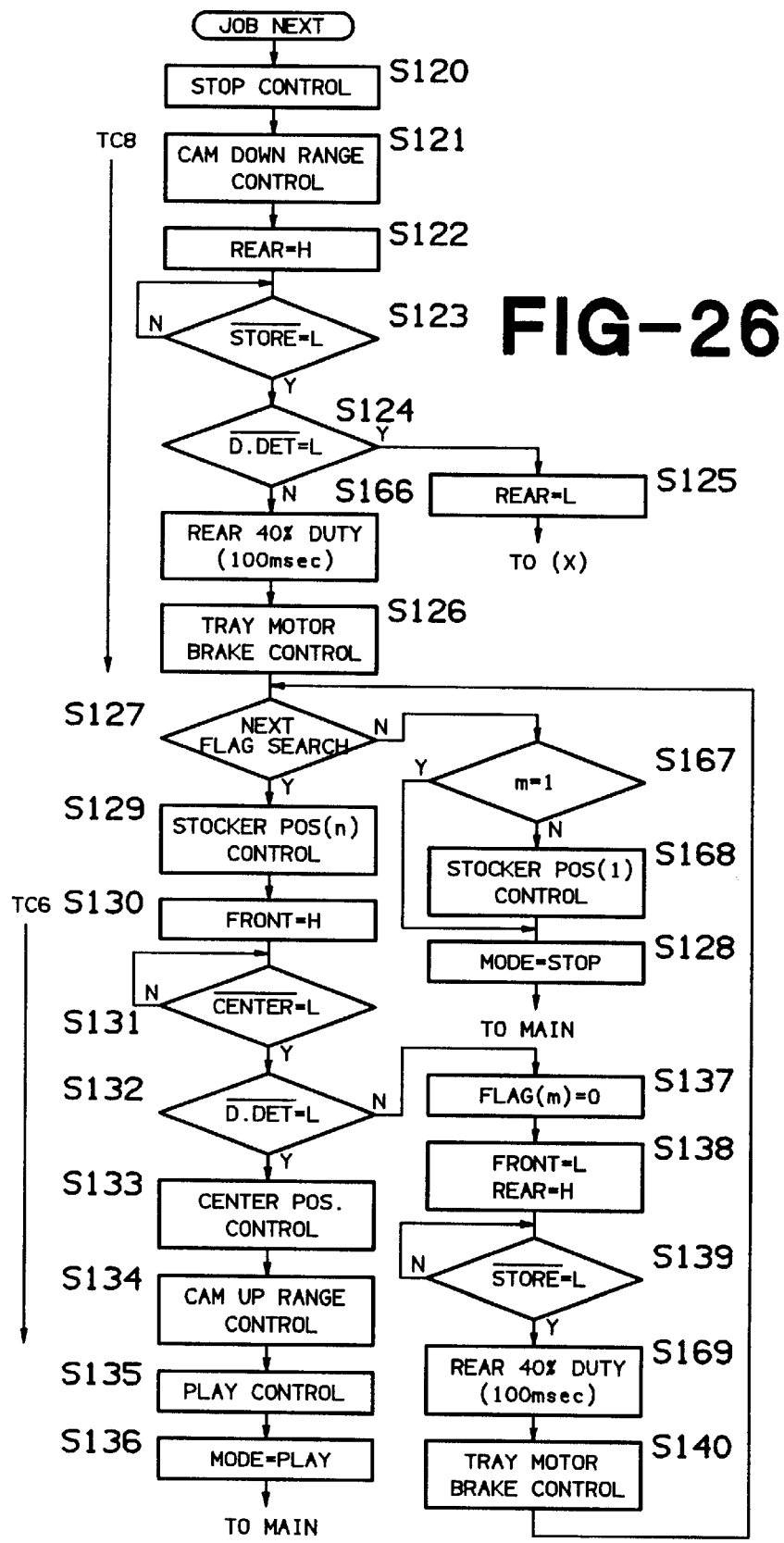
FIG. 26 is a flowchart showing the JOB NEXT routine.
Figure 27:
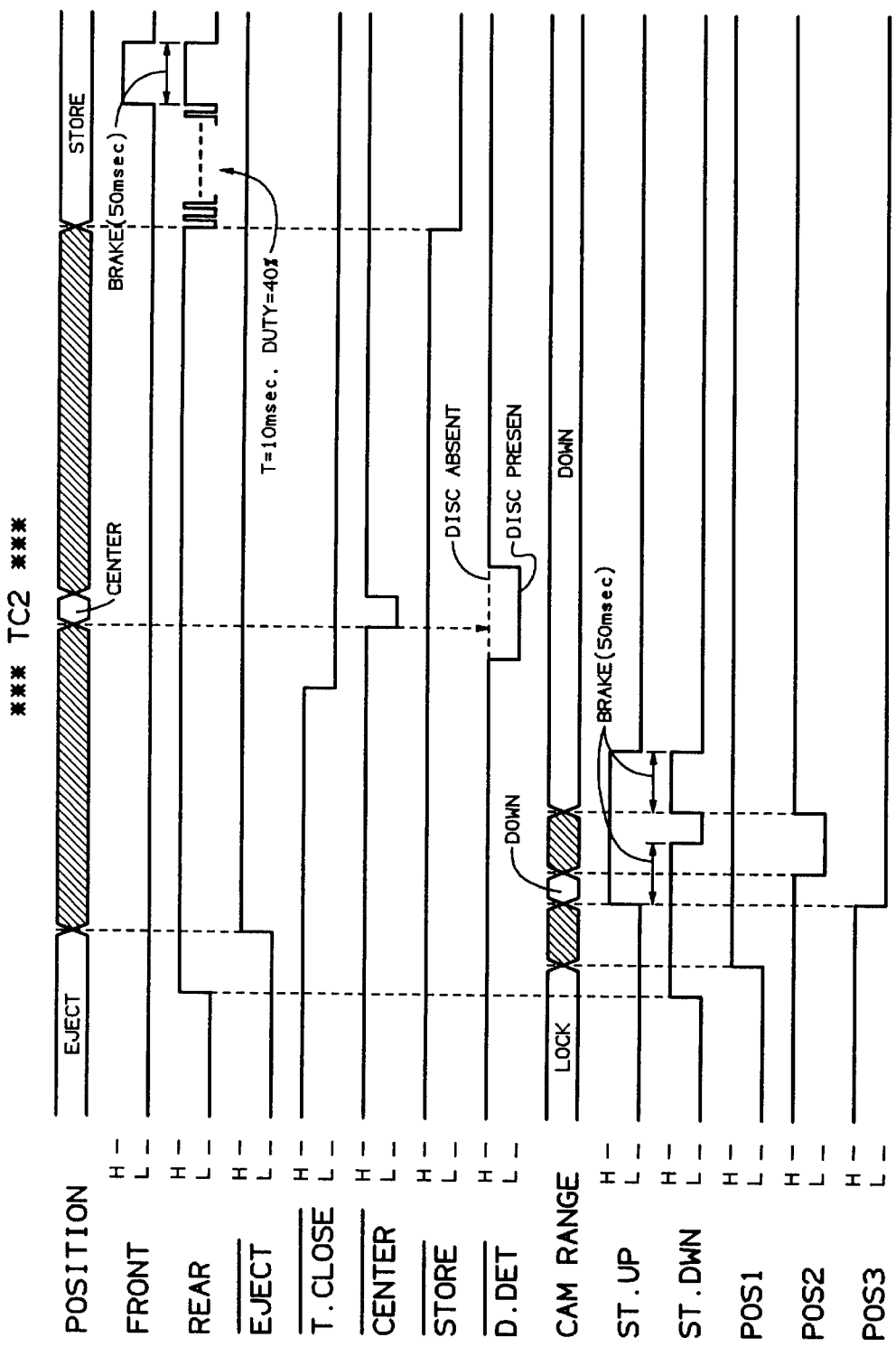
FIG. 27 is a timing chart TC2 used in describing a portion of the steps found in the flowcharts in FIGS. 17, 20 and 23.
Figure 28:
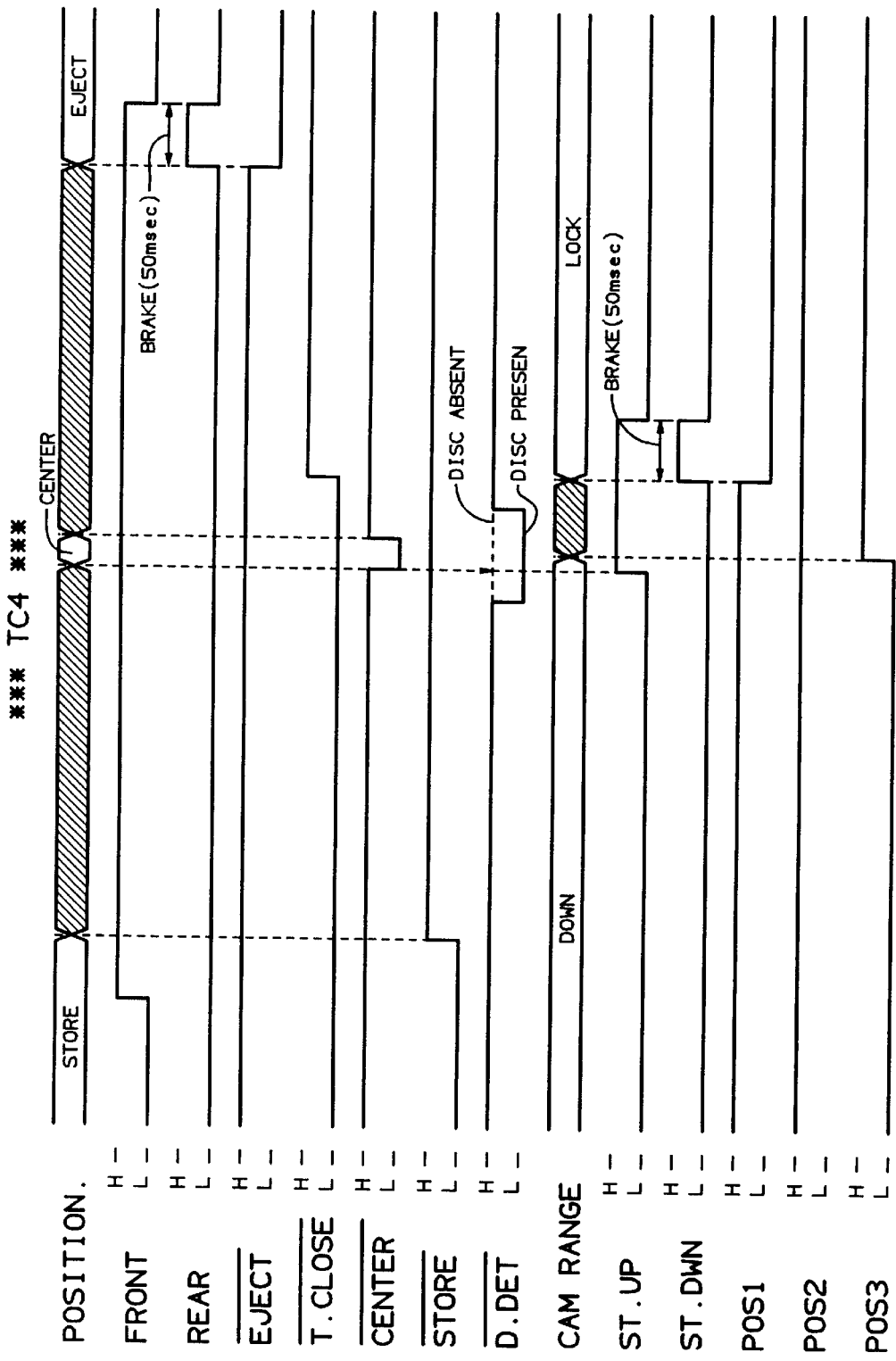
FIG. 28 is a timing chart TC4 used in describing a portion of the steps found in the flowchart in FIG. 18.

Referring now to FIG. 26, the operation of continuous playback in play mode is described. Syscon 300 detects completion of disk playback from signal processor circuit 320. Control proceeds from step S8 of FIG. 16 to step S120 in FIG. 26, where the disc is halted. Commencing with step S121, the routine proceeds through operation TC8 (movement from the playback position to the store position) through a series of steps S121–S126 and S166. These steps are identical to steps S72–S76, S78, and S158 of FIG. 22, discussed above.

At a step S127, the flags are checked sequentially beginning with FLAG(m+1) through Flag(7) to locate the next disc in stocker 50. If no disc is found, control passes to step S167 to determine if stocker 50 is at position Pos(1) (m=1). If so, control passes to step S128, where the MODE variable is set to indicate the "STOP" mode and control returns to the MAIN routine. If stocker 50 is not in Pos(1) at step S167, syscon 300 moves stocker 50 to that position at step S168 prior to proceedings with step S128.

If a Flag is detected in Flag(m+1) through Flag(7), then stocker 50 moves to POS(n) at step S129, where n is the first sequential carriage in which the flag was detected.

Step 130 commences both operations TC6 and TC7. Steps S130–S140 and S169 are identical to steps S55–S61 and S64–S67 of FIG. 21 (store position to playback position; if a disc is not in the selected carriage, return to store position), described above. If no disc is present, control proceeds from S140 to S127. If a disc is present, disc playback resumes, MODE is set to play, and control returns to the main routine.

Figures 34, 35, 36:
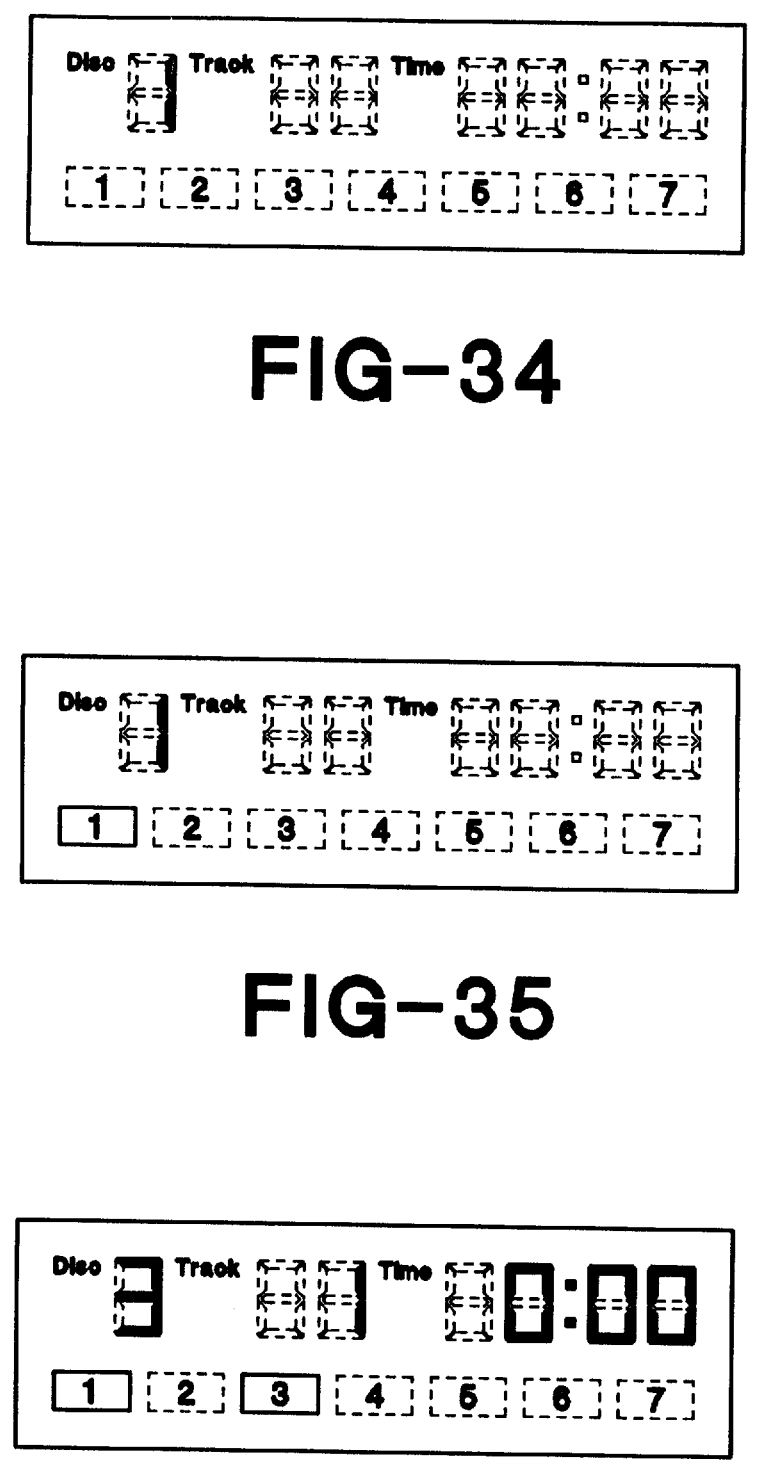

Referring now to FIGS. 34–36, a display 329 indicates various modes of operation and the presence of discs as the foregoing operations occur.

Various alterations of the embodiment described above may be effected by those of ordinary skill in the art, having the benefit of this description, without departing from the scope and spirit of the present invention. For example, during the initialization phase, stocker 50 may be raised above Pos (1) such that shuttle 28 passes below first carriage 51. Another possible alteration would be to check for shuttle disengagement during normal operations.

Although the preferred embodiment shuttle 28 engages cutout 168, the present invention is not limited to that specific structure. Several methods may be employed to engage shuttle 28 with the selected carriage. For example, the selected carriage could have a protrusion which engages a cutout in the shuttle.

In still another embodiment of the invention, stocker 50 could be fixed, and tray 20 could move vertically along stocker 50 to align with selected carriages 51–57. In such an embodiment, if shuttle 28 disengages from the selected carriage, then tray 20 and shuttle 28 move vertically to align below or above any desired carriage. Tray 20 is subsequently raised or lowered to engage shuttle 28 with the selected carriage.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A changer-type disc player for storing discs, comprising:

a chassis;

a stocker mounted on said chassis, said stocker having at least first and second carriages for supporting said discs;

a shuttle movably mounted on said chassis;

means for moving said shuttle between a store position and a playback position;

each of said at least first and second carriages having a portion engageable with said shuttle such that a selected one of said at least first and second carriages moves with said shuttle between a first position, within said stocker, and a second position when said shuttle moves between said store position and said playback position, respectively;

at least one of said stocker and said shuttle being movable along a line perpendicular to a plane defined by said first carriage to an aligned position whereat said selected one of said at least first and second carriages is in alignment and engageable with said shuttle;

means for detecting a state where said shuttle has disengaged from said portion of said selected one of said at least first and second carriages;

first means for moving said at least one of said stocker and said shuttle along said line, responsive to said means for detecting, to a predetermined position whereat each of said at least first and second carriages is out of alignment with said shuttle;

means for returning said shuttle to said store position, responsive to said first means for moving; and second means for moving said at least one of said stocker and said shuttle along said line, responsive to said means for returning, to said aligned position permitting re-engagement of said shuttle with said portion of said selected one of said at least first and second carriages.

2. A disc playback device of claim 1, further comprising:

a timer responsive to said shuttle being recalled from said playback position to said store position, and said means for detecting being responsive to said shuttle failing to return to said store position from said playback position after an expiration of a time count of said first timer.

3. A disc playback device according to claim 1, wherein said predetermined position is a position roughly midway between a first position, where a lowest carriage of said at least first and second carriages is aligned with said playback position, and a second position, where a carriage adjacent to said lowest carriage is aligned with said playback position.

4. A disc playback device according to claim 1, wherein said predetermined position is below a first position, where a lowest carriage of said at least first and second carriages is aligned with said playback position.

5. A changer-type disc player for storing discs, comprising:

a chassis;

a stocker mounted on said chassis, said stocker having a plurality of carriages for supporting said discs;

each of said plurality of carriages having a cutout;

a shuttle movably mounted on said chassis;

means for moving said shuttle between a store position and a playback position;

said shuttle engageable with said cutout of a selected one of said plurality of carriages such that said selected one of said plurality of carriages moves with said shuttle between a first position, in said stocker, and a second position when said shuttle moves between said store position and said playback position, respectively;

at least one of said stocker and said shuttle being movable along a line perpendicular to a plane defined by a carriage of said plurality of carriages to an aligned position whereat said selected one of said plurality of carriages is in alignment and engageable with said shuttle;

means for detecting a state where said shuttle has disengaged from said cutout of said selected one of said plurality of carriages;

first means for moving said at least one of said stocker and said shuttle along said line, responsive to said means for detecting, to a predetermined position whereat each of said plurality of carriages is out of alignment with said shuttle;

means for returning said shuttle to said store position, responsive to said first means for moving; and second means for moving said at least one of said stocker and said shuttle along said line, responsive to said means for returning, to said aligned position permitting re-engagement of said shuttle with said cutout of said selected one of said plurality of carriages.

6. A disc playback device of claim 4, further comprising:

a timer responsive to said shuttle being recalled from said playback position to said store position, and said means for detecting being responsive to said shuttle failing to return to said store position from said playback position after an expiration of a time count of said timer.

7. A disc playback device according to claim 5, wherein said predetermined position is a position approximately midway between a first position where a lowest carriage of said plurality of carriages is aligned with said playback position, and a second position, where a carriage adjacent to said lowest carriage is aligned with said playback position.

8. A disc playback device according to claim 5, wherein said predetermined position is below a first position where a lowest carriage of said plurality of carriages is aligned with said playback position.

9. A disk playback device according to claim 5, where each of said cutouts is located at a forward end of said plurality of carriages.

10. A disk playback device according to claim 5, wherein said means for detecting is responsive to the disk player being turned on.

11. A changer-type disk playback device comprising:

a chassis;

a plurality of carriages having disk mounting areas;

a stocker movably mounted on said chassis, said stocker supporting said plurality of carriages in a stacked fashion so that said carriages can be inserted or removed;

a shuttle movably mounted on said chassis, said shuttle being engageable with an engagement piece of a selected carriage;

means for moving said stocker along a direction perpendicular to planar surfaces of disks mounted in said disk mounting areas to an aligned position whereat said shuttle is in alignment and engageable with said selected carriage;

first position control means for controlling said means for moving and taking said selected carriage out of said plurality of carriages held in said stocker and aligning said selected carriage with a playback position for performing disk playback;

said shuttle being movable between a first position, where said selected carriage is brought to a holding position within said stocker, and a second position, where said selected carriage is at said playback position;

detecting means for detecting a carriage disengagement state, in which said shuttle is disengaged from said engagement piece of said selected carriage;

second position control means for controlling said means for moving and bringing said stocker to a prescribed position, whereat said shuttle is out of alignment with said selected carriage, responsive to said detecting means; and means for returning said shuttle toward said first position when said stocker is brought to said prescribed position and returning said shuttle to said aligned position where said shuttle is engageable with said engagement piece of said selected carriage.

12. A disc handling device comprising:

at least one storage position;

at least a second position displaced from said at least one storage position;

a carriage;

a shuttle;

means on said shuttle for engaging an engagement part of said carriage;

means for driving said shuttle between said at least one storage position and said second position;

means for detecting failure of said shuttle to reach said at least one storage position when said carriage is in said at least one storage position, whereby a mis-engagement of said means on said shuttle for engaging and said engagement part is detected; and means, responsive to said means for detecting failure, for incrementally shifting said carriage out of alignment with a plane defined by motion of said shuttle, and then resuming driving said shuttle toward said at least one storage position, whereby said means on said shuttle for engaging and said engagement part of said carriage are aligned for engagement thereof.

13. The disc handling device according to claim 12, further comprising, repetitive means, responsive to said means for detecting failure, for incrementally shifting said carriage, at least one additional time, if mis-engagement is still detected after a first attempt.

14. A changer-type disc player for storing discs, comprising:

a chassis;

a stocker mounted on said chassis, said stocker having at least first and second carriages for supporting said discs;

a shuttle movably mounted on said chassis;

means for moving said shuttle between a store position, disposed within said stocker, and a playback position;

said at least first and second carriages having a portion engageable with said shuttle such that a selected one of said at least first and second carriages moves with said shuttle when said shuttle moves between said store and playback positions;

at least one of said stocker and said shuttle being movable along a line perpendicular to a plane defined by a carriage of said at least first and second carriages to an aligned position whereat said selected one of said first and second carriages is in alignment and engageable with said shuttle;

means for detecting a state where said shuttle has disengaged from said portion of said selected one of said first and second carriages;

first means for moving at least one of said stocker and said shuttle along said line, responsive to said means for detecting, to a predetermined position whereat said shuttle is out of alignment with said selected one of said at least first and second carriages;

means for returning, responsive to said first means for moving, said shuttle to said store position; and second means for moving said at least one of said stocker and said shuttle along said line, responsive to said means for returning, to said aligned position permitting re-engagement of said shuttle with said portion of said selected one of said at least first and second carriages.

15. A disc playback device of claim 14, further comprising:
   a timer responsive to said shuttle being recalled from said playback position to said store position, and
   said means for detecting being responsive to said shuttle failing to return to said store position from said playback position after an expiration of a time count of said timer.

16. A disc playback device according to claim 14, wherein said predetermined position is a position roughly midway between a first position, where a lowest carriage of said at least first and second carriages is aligned with said playback position, and a second position, where a carriage adjacent to said lowest carriage is aligned with said playback position.

17. A disc playback device according to claim 14, wherein said predetermined position is below a first position, where a lowest carriage of said at least first and second carriages is aligned with said playback position.

18. A disc playback device according to claim 14, wherein said first means for moving is also responsive to a failure of said means for returning.

19. A disc playback device according to claim 17, further comprising means for halting operation of said disc playback player responsive to a predetermined number of failures of said means for returning.

20. A disk changer, comprising:
   a chassis;
   a stocker, connected to said chassis, holding a plurality of disk-supporting carriages;
   a shuttle movably carried on said chassis to allow translation in a first direction between a first position within said stocker to a second position and in a second direction, opposite to said first direction;
   said shuttle having an engagement element;
   each of said carriages having a mating portion engageable with said engagement element;
   at least one of said shuttle and said stocker being movably connected to said chassis such that said at least one of said shuttle and said stocker is translatable relative to the other of said shuttle and said stocker in a direction at least partly perpendicular to said first direction, whereby said mating portion of a selected one of said carriages is alignable with said shuttle;

said selected one of said carriages being moved into and out of said stocker by said translation of said shuttle in one of said first direction and said second direction when said mating portion of said selected one of said carriages is engaged with said engagement element;

means for detecting a disengagement of said engagement element from said mating portion of said selected one of said carriages; and means for translating in a third direction said at least one of said shuttle and said stocker, responsive to said means for detecting, to move said mating portion of said selected one of said carriages out of alignment with said engagement element to a predetermined position that permits said shuttle to move to said first position.

21. The disk changer of claim 20, further including means for translating said shuttle in said second direction toward said stocker when said mating portion of said selected one of said carriages is out of alignment with said engagement element.

22. The disk changer of claim 21, further including means for translating said one of said shuttle and said stocker to permit said mating portion of said selected one of said carriages to engage with said engagement element.

23. The disk changer of claim 20, said means for detecting a disengagement detects a failure of said shuttle to reach said first position within a specified time period when said selected carriage is being moved to said stocker.

24. The disk changer of claim 20, wherein said predetermined position allows translation of said shuttle in said first direction between two adjacent ones of said carriages to said first position.

25. The disk changer of claim 20, wherein said predetermined position allows translation of said shuttle in said first direction below a bottommost of said carriages to said first position.

26. A disk changer, comprising:
   a chassis;
   a stocker, connected to said chassis, holding a plurality of disk-supporting carriages;
   a shuttle movably carried on said chassis to allow translation in a first direction between a first position inside said stocker and a second position and in a second direction, opposite to said first direction;
   said shuttle having an engagement element;
   each of said carriages having a mating portion engageable with said engagement element;
   a motor;
   said motor being drivably connected to at least one of said shuttle and said stocker;
   said at least one of said shuttle and said stocker being movably connected to said chassis such that said at least one of said shuttle and said stocker is translatable relative to the other of said shuttle and said stocker in a direction at least partly perpendicular to said first direction, whereby said mating portion of a selected one of said carriages is alignable with said shuttle;
   said selected one of said carriages being moved into and out of said stocker by said translation of said shuttle in one of said first direction and said second direction when said mating portion of said selected one of said carriages is engaged with said engagement element;
   a controller programmed to execute an operation responsively to a disengagement of said mating portion of said selected one of said carriages from said engagement element;

said controller being connected to control said motor; and said operation including translation of said at least one of said shuttle and said stocker out of alignment with the other of said shuttle and said stocker to a predetermined position that permits movement of said shuttle in said second direction to said first position.

27. The disk changer of claim 26, wherein said operation further comprises translation of said shuttle in said second direction toward said first position when said at least one of said shuttle and said stocker is at said predetermined position.

28. The disk changer of claim 27, wherein said operation further comprises translation of said one of said shuttle and said stocker to permit said mating portion of said selected one of said carriages to engage with said engagement element.

29. The disk changer of claim 26, wherein said disengagement is detected when said selected one of said carriages is being moved into said stocker.

30. The disk changer of claim 26, wherein said disengagement is detected by said controller when said shuttle is being translated toward said first position and said shuttle fails to reach said first position within a predetermined time period.

31. The disk changer of claim 26, wherein said predetermined position allows translation of said shuttle in said second direction between adjacent ones of said carriages to said first position.

32. The disk changer of claim 26, wherein said predetermined position allows translation of said shuttle in said second direction below a bottommost of said carriages into said stocker.

* * * * *